United States Patent [19]
Nishio

[11] Patent Number: 6,088,084
[45] Date of Patent: Jul. 11, 2000

[54] ORIGINAL CARRIER AND IMAGE READER

[75] Inventor: Tomonori Nishio, Kanagawa, Japan

[73] Assignee: Fuji Photo Film Co., Ltd., Kanagawa, Japan

[21] Appl. No.: 09/174,571

[22] Filed: Oct. 19, 1998

[30] Foreign Application Priority Data

Oct. 17, 1997 [JP] Japan ................................. 9-285831
Oct. 2, 1998 [JP] Japan ................................ 10-280820

[51] Int. Cl.$^7$ .......................... G03B 27/52; G03B 27/62
[52] U.S. Cl. ............................... 355/75; 355/55; 355/61
[58] Field of Search ................................ 355/72, 44, 55, 355/56, 59, 61, 75

[56] References Cited

U.S. PATENT DOCUMENTS

| | | | |
|---|---|---|---|
| 2,460,060 | 1/1949 | Butler | 355/40 |
| 2,461,405 | 2/1949 | Appling | 355/44 |
| 2,498,278 | 2/1950 | Kaplowitz | 355/71 |
| 3,864,033 | 2/1975 | Rieder | 353/101 |
| 4,857,964 | 8/1989 | Pohlman et al. | 355/40 |
| 4,994,850 | 2/1991 | Imamura et al. | 355/41 |
| 5,343,273 | 8/1994 | Yamamoto et al. | 355/75 |
| 5,453,817 | 9/1995 | Oka et al. | 355/75 |
| 5,489,966 | 2/1996 | Kawashima et al. | 355/43 |
| 5,673,104 | 9/1997 | Rottner | 355/75 |
| 5,835,202 | 11/1998 | Rosati et al. | 355/75 |
| 5,859,691 | 1/1999 | Rottner et al. | 355/75 |

*Primary Examiner*—Alan A. Mathews
*Assistant Examiner*—Rodney Fuller
*Attorney, Agent, or Firm*—Sughrue, Mion, Zinn, Macpeak & Seas, PLLC

[57] ABSTRACT

An object of this invention is to provide an original carrier and an image reader capable of performing a focusing operation every original carrier.

To achieve this object, a slit hole 32 extending in a direction perpendicular to a film conveying direction is formed in a width enlarging portion of a film conveying path 34. Focusing charts 58 are formed on faces of a glass plate 38 fitted into the slit hole 32 on sides of the film conveying path 34 in both end portions of the glass plate 38 in its longitudinal direction. When light from a light source is transmitted through the focusing charts 58 of the glass plate 38 and is incident to a line CCD, focusing control is performed by a microprocessor so as to maximize the contrast of an image of each of the focusing charts 58. The focusing control can be also performed so as to maximize the contrast of an image of a photographic film 22.

25 Claims, 13 Drawing Sheets

ORIGINAL CARRIER AND IMAGE READER

BACKGROUND OF THE INVENTION

1. Field of the Invention

The present invention relates to an original carrier and an image reader.

2. Description of the Related Art

Among image readers for reading an image recorded on an original such as a photographic film and the like and exposing this image onto a photosensitive material such as printing paper and the like, there is a type of image reader in which a plurality of types of original carriers for holding the original are prepared in accordance with the type of original to be read and these original carriers are changed and set for each type of original and the original is read.

In this type of image reader, there are cases in which the positions of the originals are different for each original carrier. Accordingly, when the focusing operation of an image is performed for each original carrier at a stage before the focusing operation of the image is performed for each original sheet, the focusing operation for each original sheet is facilitated.

However, in a conventional original carrier and conventional image reader, a focusing operation is unable to be performed for each original carrier.

Further, there are cases in which the original image was defocused due to environmental factors such as a change in the surrounding temperature and the like even when the original carriers are of the same type.

SUMMARY OF THE INVENTION

In consideration of such facts, an object of the present invention is to provide an original carrier and an image reader capable of performing a focusing operation for each original carrier.

In a first aspect of the present invention, an original carrier comprises holding means capable of holding an original having an image recorded thereon; light transmitting means provided in said holding means for transmitting light from a light source and irradiating the light onto an area including an image recording range of the original held by said holding means; and a focusing chart for performing a focusing operation disposed in the vicinity of an original holding position of said holding means.

When the light from the light source is irradiated onto the original held by the holding means, this light is transmitted through the light transmitting means and is irradiated onto the area including the image recording range of the original thereby enabling the image recorded on the original to be read.

Since the focusing chart for the focusing operation is disposed in the vicinity of the original holding position of the holding means, the focusing operation can be performed such that the contrast of an image of this focusing chart is maximized. Accordingly, when a plurality of types of original carriers are prepared in accordance with the type of original and the focusing operation is performed for the image of the original held by each of these original carriers, the focusing operation according to the type of carrier for each original carrier can be first performed by the focusing chart. Further, the focusing operation can be performed for each of the original carriers in response accordance to changes in the situation such as a change in temperature and the like.

In a second aspect of the present invention, the focusing chart in the first aspect of the present invention is provided such that the focusing chart is located in a position outside the image recording range of the original of the light transmitting means.

Therefore, when the original image is read, this image and an image of the focusing chart do not overlap each other.

In a third aspect of the present invention, the focusing chart in the first aspect of the present invention may be movably provided between a position outside the image recording range of the original and a position within the image recording range.

Therefore, when the focusing operation with respect to the focusing chart is performed, the focusing chart is moved to a position within the image recording range and the focusing operation can be performed with the focusing chart in the same position as the image.

When the focusing operation is performed for the original image and this image is read, the focusing chart can be moved to a position outside the image recording range so that the image and the image of the focusing chart do not overlap each other.

In a fourth aspect of the present invention, an image reader comprises a plurality of types of original carriers each described in one of said first to third aspects and prepared in accordance with the type of original; a mounting portion capable of having one of the plurality of types of original carriers selectively mounted thereto; image reading means for reading the image of the original held by the holding means of the original carrier mounted to the mounting portion, and for reading the focusing chart provided arranged in the original carrier; and focusing means for performing a focusing operation of the image reading means so as to maximize the contrast of an image of the focusing chart read by the image reading means.

Namely, the focusing means performs the focusing operation of the image reading means in accordance with the type of original carrier selectively mounted to the mounting portion such that the contrast of the image of the focusing chart read by the image reading means is maximized. Therefore, the focusing operation for each of the original carriers can be first performed when the positions of the originals (particularly, the positions of the light from the light source in the optical axis direction) are different for each original carrier or are different from each other due to changes in the situation such as a change in temperature and the like.

In a fifth aspect of the present invention, the focusing operation of the image reading means can be performed so as to maximize the contrast of the image read by the image reading means, and one of the focusing operation with respect to the focusing chart and the focusing operation with respect to the original can be selected in the fourth aspect of the present invention.

Accordingly, one of the focusing operation with respect to the focusing chart and the focusing operation with respect to the original can be selected in accordance with the conditions. This selection may be made by an automatic selecting means for an automatic selection provided in the image reader and may be also manually made by an operator.

In a sixth aspect of the present invention, one of the focusing operation with respect to the focusing chart and the focusing operation with respect to the original is selected in accordance with the state of the original in the fifth aspect of the present invention.

Here, the state of the original includes the existence or nonexistence of curl in the original, the existence or nonexistence of a slide mount (a frame member mounted to a reversal film for each image frame) and the like and dispersion in position of the image in the optical axis direction. For example, when the positions (particularly, the positions of the light from the light source in the optical axis direction) are different for each image, the focusing operation with respect to the focusing chart is selected and the focusing operation with respect to the original is next selected so that the focusing operations can be performed with high accuracy. When the light positions in the optical axis direction are approximately the same for each image, only the focusing operation with respect to the focusing chart may be performed.

In a seventh aspect of the present invention, one of the focusing operation with respect to the focusing chart and the focusing operation with respect to the original is selected in accordance with the reading density of the original in the fifth aspect of the present invention.

Accordingly, the focusing operation can be performed by a suitable method in accordance with the reading density of the original. For example, when the reading density of the original is low (as in the case of a so-called prescan, for example), the focusing operation with respect to the focusing chart is performed. When the reading density of the original is high (as in the case of a so-called fine scan for example), the focusing operation with respect to the image is performed. Accordingly, an optimum focusing means can be selected in accordance with the reading density of the original.

In an eighth aspect of the present invention, the image reading means in one of the fourth to seventh aspects of the present invention reads the image in a position offset by a prescribed offset amount from a focusing position of the image reading means provided by the focusing means when the image of the original held by the holding means of the original carrier is read.

Here, the focusing position of the image reading means provided by the focusing means includes both a focusing position with respect to the focusing chart and a focusing position with respect to the image.

Accordingly, for example, when the position of the original is separated by a constant distance from the position of the focusing chart, this separation of the position of the original can be corrected by offsetting this separation by a prescribed offset amount from the focusing position with respect to the focusing chart and the image can be read. Similarly, when the original is curled, defocusing caused by this curl of the original is corrected by offsetting this defocusing by a prescribed offset amount from the focusing position with respect to the image and the image can be read.

In addition to this, for example, in the case of a so-called line sensor, the focusing means performs the focusing operation such that the image is stopped at the time the image is focused and the contrast of this image is maximized. However, the image is sub-scanned and read at an image reading time. Therefore, there are cases where the image positions are different at the focusing time and the image reading time. However, the focusing operation with respect to the image can be further precisely performed even in this case since the image is read in a position offset by a prescribed offset amount from the focusing position with respect to the image.

In a ninth aspect of the present invention, the offset amount in the eighth aspect of the present invention can be independently set in accordance with the type of the original carrier mounted to the mounting portion and in accordance with whether the focusing operation is performed with respect to the focusing chart or the original.

Accordingly, when the types of the original carrier are different, the offset amount is set corresponding to this original carrier and the image can be read. Further, the offset amount is set in accordance with the focusing object and the image can be read by independently setting the offset amount in accordance with whether the focusing operation is performed with respect to the focusing chart or the original.

In a tenth aspect of the present invention, a present amount is first set as the reference and the offset amount may be changed or set by an operation from this present amount in the eighth or ninth aspect of the present invention.

Since the offset amount is set to a preset value, the operation for setting or changing the offset amount is easily performed. For example, when film thicknesses and curl amounts are different from each other in accordance with the type of film, the offset amount is correspondingly changed and the focusing operation can be precisely performed with respect to the image.

DESCRIPTION OF THE PREFERRED EMBODIMENTS

One embodiment of the present invention will next be described in detail with reference to the drawings. In the following description, a digital laboratory system 10 in accordance with this embodiment will first be explained.

Figure 1:
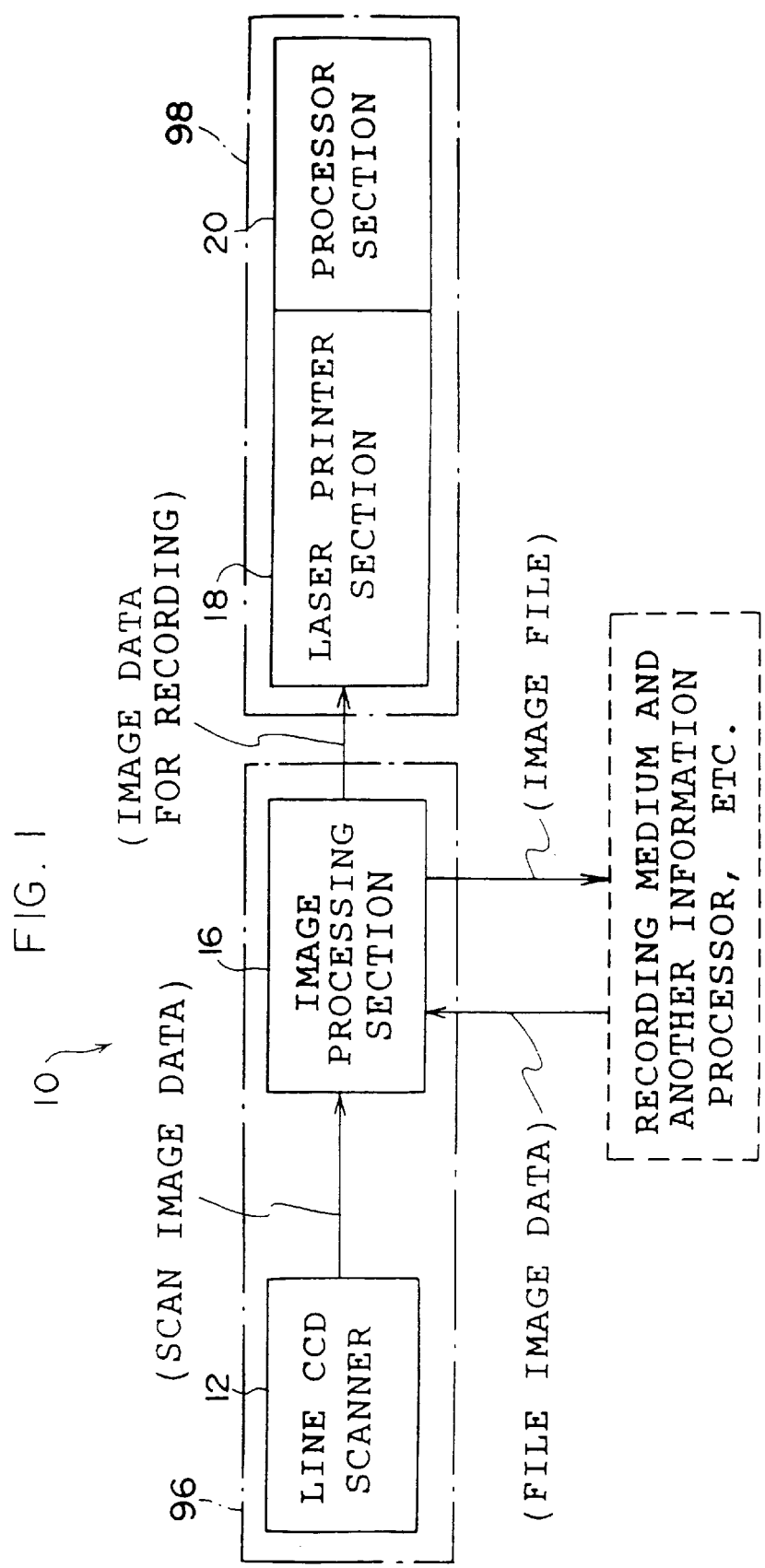
FIG. 1 is a block diagram schematically showing a digital laboratory system in accordance with one embodiment of the present invention.
Figure 2:
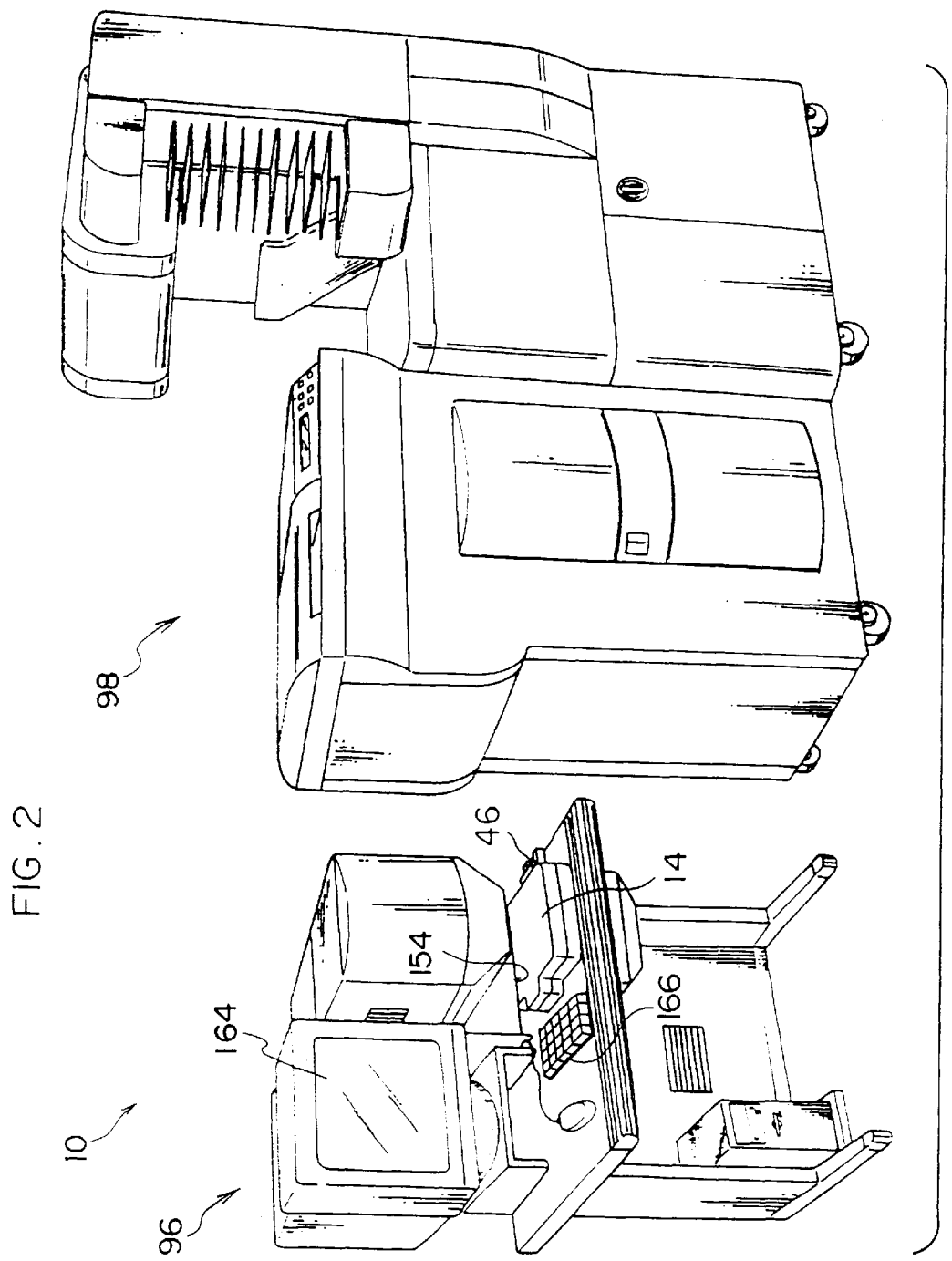
FIG. 2 is a perspective view showing an external appearance of the digital laboratory system in accordance with one embodiment of the present invention.

FIG. 1 shows a schematic construction of the digital laboratory system 10 in accordance with this embodiment. FIG. 2 shows an external appearance of the digital laboratory system 10. As shown in FIG. 1, the digital laboratory system 10 comprises a line CCD scanner 12, an image processing section 16, a laser printer section 18, and a processor section 20. As shown in FIG. 2, the line CCD scanner 12 and the image processing section 16 are provided in an input section 96. The laser printer section 18 and the processor section 20 are provided in an output section 98.

The line CCD scanner 12 is provided to read a film image recorded on a photographic film such as a negative film, a reversal film and the like. For example, the line CCD scanner 12 can read images of a photographic film of size 135, a photographic film of size 100, a photographic film forming a transparent magnetic layer thereon (photographic film of size 240: so-called APS film), and photographic films of size 120 and size 220 (brownie size). This line CCD scanner 12 has a line CCD 74 (see FIG. 3) having sensors for R(red), G(green) and B(blue) photometry arranged in three columns. The film image as the above-described object to be read is read by the line CCD 74 and the line CCD scanner 12 outputs image data of the three colors of red, green, and blue.

The image data outputted from the line CCD scanner 12 are inputted to the image processing section 16. The image processing section 16 is also constructed such that image data obtained by photographing using a digital camera, image data obtained by reading an original other than a film image (e.g., a reflecting original) by the scanner, image data generated by a computer and the like (hereinafter, these image data are generally called file image data) can be inputted to the image processing section 16 from its exterior (e.g., the image data are inputted through a memory medium such as a memory card and the like and are inputted from another information processor through a communication line and the like).

The image processing section 16 performs image processing such as various kinds of corrections with respect to the inputted image data, and outputs the processed data to the laser printer section 18 as image data for recording. The image processing section 16 can also externally output the processed image data as an image file (e.g., the image processing section 16 outputs the image data to a memory medium such as a memory card and transmits the image data to another information processor through a communication line).

The laser printer section 18 has a laser light source for irradiating laser beams of red, green, and blue. The laser printer section 18 irradiates a laser beam modulated in accordance with the image data for recording inputted from the image processing section 16 onto printing paper, and records the image onto the printing paper by scanning exposure. The processor section 20 performs each of the processings of coloring development, bleaching and fixing, water washing and drying on the printing paper having the image recorded thereon by the scanning exposure in the laser printer section 18. Thus, the image is formed on the printing paper.

Figure 3:
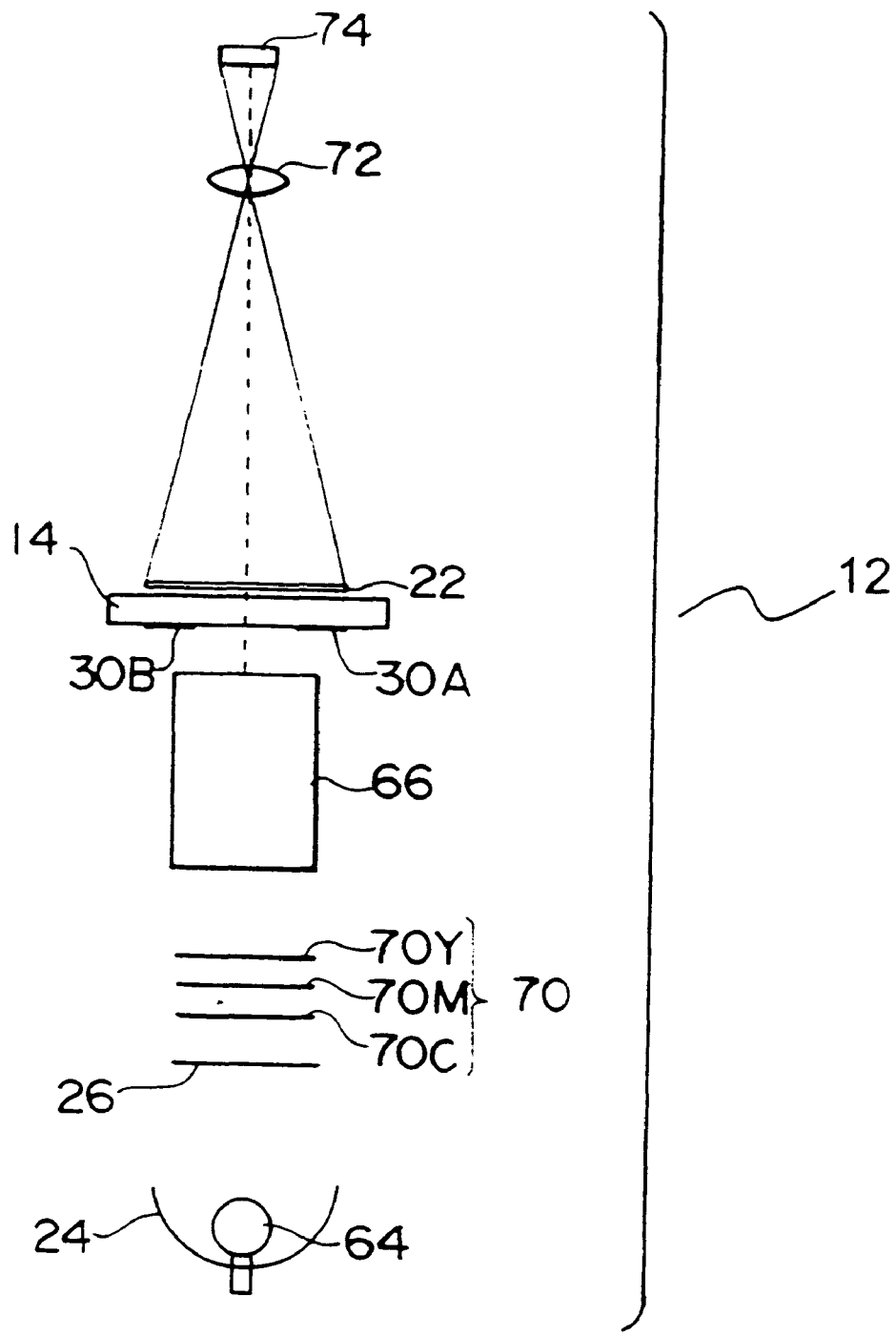
FIG. 3 is a side view schematically showing an optical system of a line CCD scanner in accordance with one embodiment of the present invention.
Figure 4:
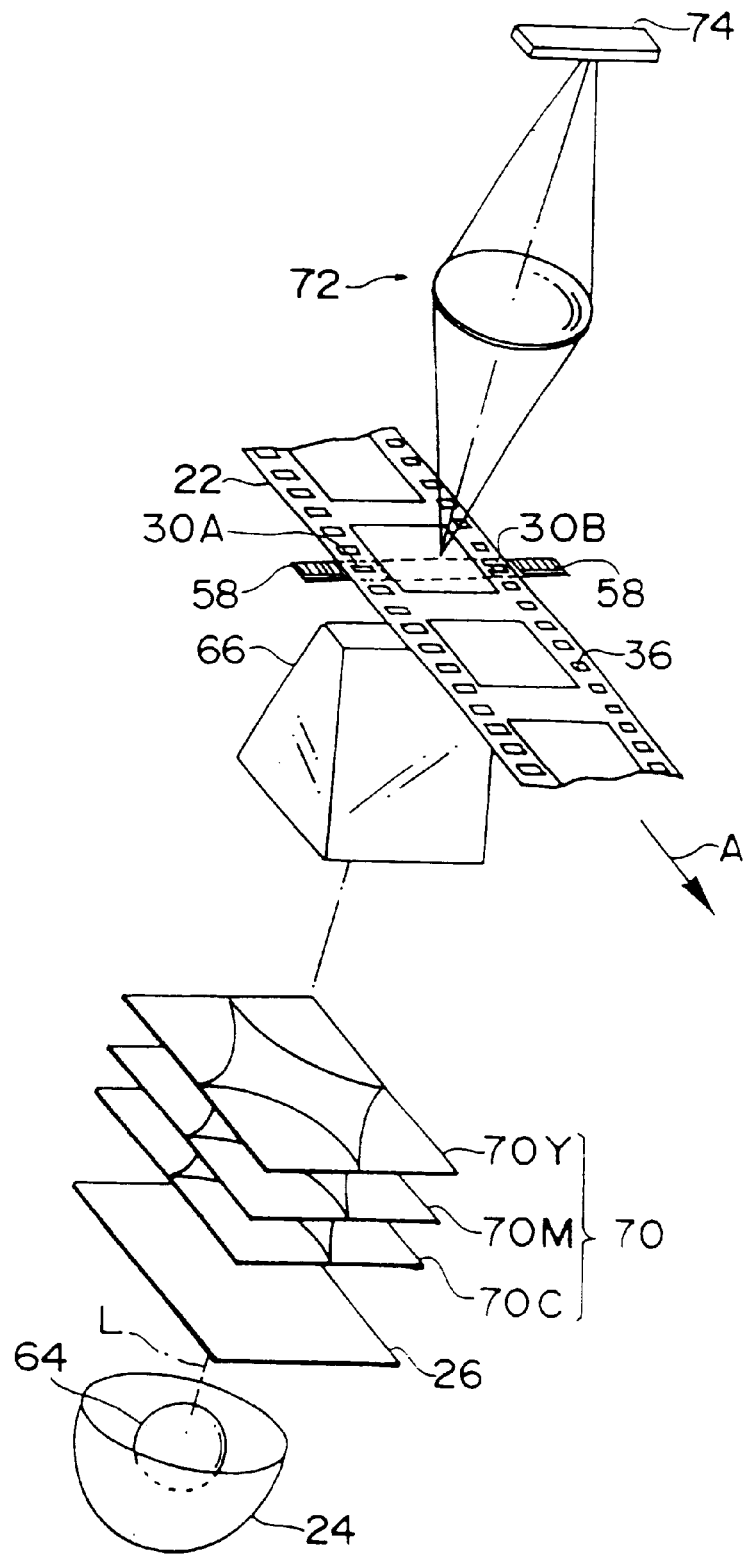
FIG. 4 is a perspective view schematically showing the optical system of the line CCD scanner in accordance with one embodiment of the present invention.

FIGS. 3 and 4 show the schematic construction of an optical system of the line CCD scanner 12 comprising the film carrier 14 (described later in detail) in the present invention. This optical system is constructed from a metal halide lamp, a halogen lamp, and the like, and has a light source 64 for irradiating light onto the photographic film 22. A reflector 24 for transmitting infrared (IR) light and having a parabolic shape is disposed such that the light source 64 is located in a focal point position. Light emitted from the light source 64 and reflected by the reflector 24 is irradiated in the direction of the photographic film 22.

An IR cut filter 26, light adjusting filters 70C, 70M, 70Y for cyan (C), magenta (M) and yellow (Y), and a light diffusion box 66 are sequentially arranged along an optical axis L on a light emitting side of the light source 64. The IR cut filter 26 removes the infrared light from the light emitted from the light source 64. The light diffusion box 66 changes light irradiated onto the photographic film 22 to diffusion light. The light adjusting filters 70C, 70M, 70Y are constructed such that these light adjusting filters can be independently moved. The extent to which the light adjusting filters are inserted into an optical path is adjusted in consideration of the balance of the light amounts of the respective light color components emitted from the light source 64, and in consideration of the sensitivities of the line CCD 74 to the respective light color components and the like. Thus, it is possible to adjust the light receiving amounts of the three colors of red, green and blue in the line CCD 74.

The photographic film 22 is conveyed such that a film face is set to be perpendicular to the optical axis L by the film carrier 14 disposed on a light emitting side of the light diffusion box 66 and the film image sequentially passes through a position of the optical axis L. In FIGS. 4, 6, 8 and 9, the photographic film 22 (a photographic film of 135 size) having an elongated shape is shown as an example. However, a dedicated film carrier can be prepared for each of a slide film (a reversal film) held by a holder for each frame of the slide, an APS film, and the like. Further, these photographic films can be also conveyed to the optical axis position.

A slit aperture 32 (see FIGS. 5 to 7) extending in a direction perpendicular to a conveying direction of the photographic film 22 is formed in a film conveying path 34 of the film carrier 14. The light emitted from the light source 64 is transmitted through this slit hole 32. The slit hole 32 is formed such that the length of the slit hole 32 is longer than the length of the photographic film 22 in its transverse direction.

A lens unit 72 and a line CCD 74 are sequentially disposed along the optical axis L on a side opposite to the light source 64 through the film carrier 14 for conveying the photographic film 22. The lens unit 72 focuses and forms light transmitted through the photographic film 22 as an image. The line CCD 74 is disposed in an image forming position. FIGS. 3 and 4 show only a single lens as the lens unit 72, but this lens unit 72 may be a zoom lens constructed from a plurality of lenses.

The line CCD 74 is arranged in a line shape such that a photoelectric converting element such as a CCD cell and a photodiode is perpendicular to the conveying direction (the direction of an arrow A shown in each of FIGS. 4 to 7 and its opposite direction) of the photographic film 22. Further, sensing portions having an electronic shutter mechanism are provided in three lines parallel with each other and are spaced apart from each other. The line CCD 74 is constructed from a so-called three-line color CCD in which one of red, green, and blue color decomposing filters is attached onto a light incident side of each of the sensing portions.

Accordingly, a main scanning operation for reading the film is performed in the direction in which the CCD cells are aligned and a sub-scanning operation for reading a film image is performed by conveying the photographic film 22.

Each line CCD 74 is arranged such that the light receiving face of each of the sensing portions is in conformity with an image forming point position of the lens unit 72. A transfer portion constructed from many CCD cells is arranged in accordance with each of the sensing portions in the vicinity of each of the sensing portions. Electric charges accumulated in each CCD cell of each sensing portion are sequentially transferred through a corresponding electric transfer portion. A shutter is arranged between the line CCD 74 and the lens unit 72 although this shutter is not illustrated in the drawings.

Figure 11:
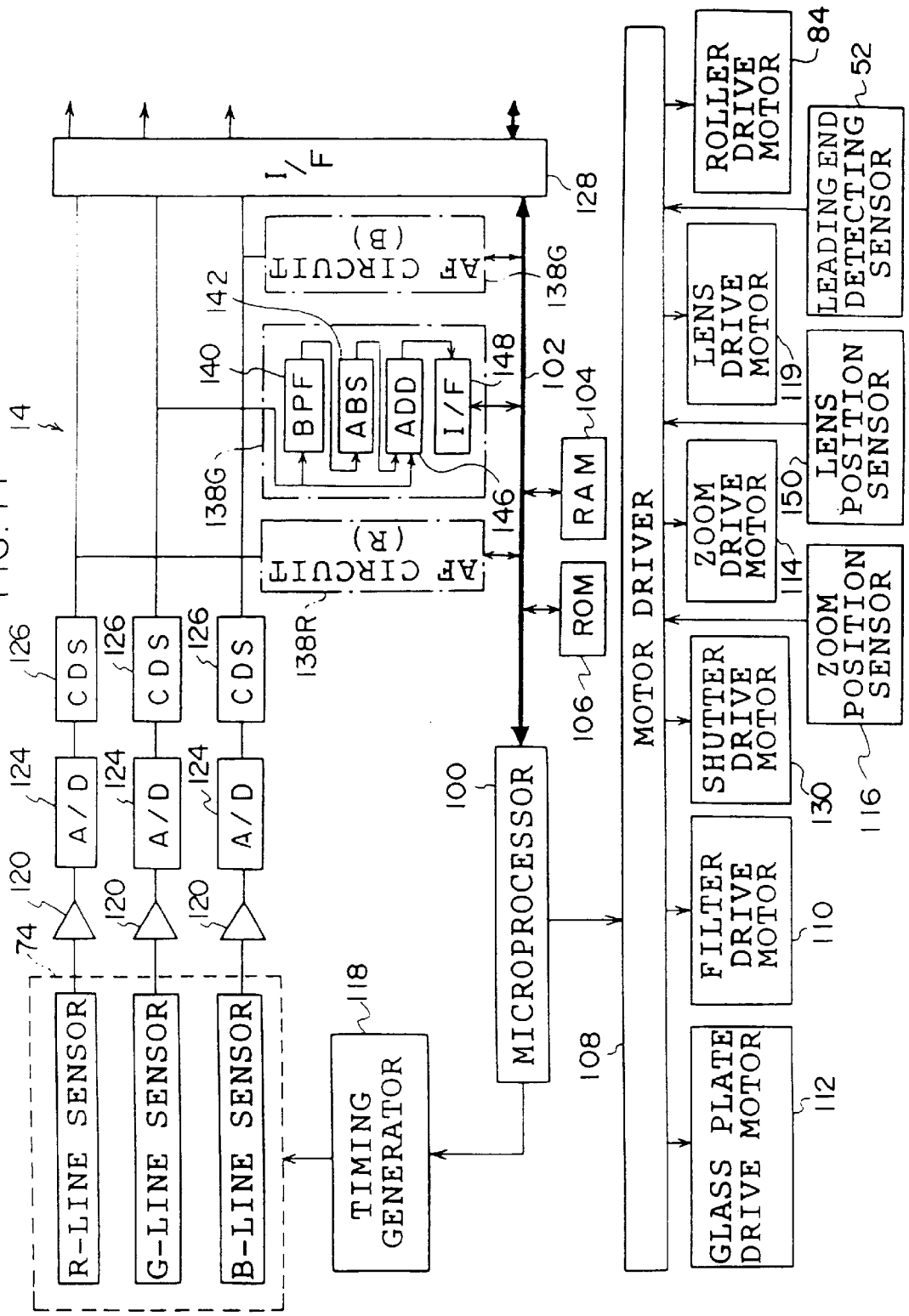
FIG. 11 is a block diagram showing the schematic construction of an electric system of the line CCD scanner in accordance with one embodiment of the present invention.

FIG. 11 shows the schematic construction of an electric system of the line CCD scanner 12. The line CCD scanner 12 has a microprocessor 100 for controlling the entire operation of the line CCD scanner 12. RAM 104 (e.g., SRAM) and ROM 106 (e.g., ROM capable of rewriting stored contents) are connected to the microprocessor 100 through a bus 102. A motor driver 108 is also connected to the microprocessor 100. A filter drive motor 110 is connected to the motor driver 108. The filter drive motor 110 can independently slide and move each of the light adjusting filters 70C, 70M, 70Y.

Further, a glass plate drive motor 112 is connected to the motor driver 108. The glass plate drive motor 112 can slide and move a glass plate 38 described later in its longitudinal direction.

The microprocessor 100 turns the light source 64 (see FIGS. 3 and 4) on and off in association with the on-off state of an unillustrated power switch. Further, the microprocessor 100 independently slides and moves each of the light adjusting filters 70C, 70M, 70Y by the filter drive motor 110 and adjusts the light amount inputted to the line CCD 74 for each light color component when the film image is read (optically measured) by the line CCD 74.

Further, a zoom drive motor 114 and a zoom position sensor 116 are connected to the motor driver 108. The zoom drive motor 114 changes the zoom magnification of the lens unit 72 by relatively moving the positions of the plurality of lenses of the lens unit 72. The zoom position sensor 116 detects the zoom magnification of the lens unit 72. The microprocessor 100 determines the zoom magnification of the lens unit 72 in accordance with the size of the photographic film 22 as a reading object, whether trimming is performed or not, and the like. The zoom magnification of the lens unit 72 is then changed to the above determined magnification by the zoom drive motor 114 on the basis of the zoom magnification detected by the zoom position sensor 116.

On the basis of the film image data read by the line CCD 74 and the data of an image of a focusing chart 58 of the film carrier 14 described later in detail, the microprocessor 100 also performs focusing control for moving the image forming point position of the lens unit 72 by the lens drive motor 119 so as to maximize the contrast of the film image and the image of the focusing chart 58. Thus, the image forming point position of the lens unit 72 is conformed to the light receiving face of the line CCD 74.

The focusing control of the microprocessor 100 can be performed on the basis of the data of the film image or the data of the focusing chart 58 by selecting either automatic or manual control by either an operator's operation of an unillustrated switch or a key operation of a personal computer 158.

The focusing control may be performed by providing a distance sensor for measuring the distance between the photographic film or the focusing chart 58 and the lens unit 72 (or the line CCD 74) by infrared rays and the like. In this case, the focusing control is performed on the basis of the distance detected by the distance sensor instead of the film image and the data of the focusing chart 58.

A timing generator 118 is connected to the line CCD 74. The timing generator 118 generates various kinds of timing signals (clock signals) for operating the line CCD 74, an A/D converter 124 described later and the like. A signal output terminal of the line CCD 74 is connected to the A/D converter 124 through an amplifier 120. A signal outputted from the line CCD 74 is amplified by the amplifier 120 and is converted to digital data by the A/D converter 124.

An output terminal of the A/D converter 124 is connected to an interface (I/F) circuit 128 through a correlative double sampling circuit (CDS) 126. The CDS 126 samples both the field through data showing the level of a field through signal and the pixel data showing the level of a pixel signal. The CDS 126 then subtracts the field through data from the pixel data for every pixel. The CDS 126 sequentially outputs the computed results (the pixel data exactly corresponding to the accumulated electric charge amount in each of the CCD cells) to the image processing section as scan image data through the I/F circuit 128.

Light measuring signals of red, green, and blue are outputted from the line CCD 74 in parallel with each other. Accordingly, three signal processing systems each constructed for the amplifier 120, the A/D converter 124 and the CDS 126 are provided. Red, green, and blue image data are outputted from the I/F circuit 128 in parallel with each other as scan image data.

A shutter drive motor 130 for opening and closing the shutter is connected to the motor driver 108. Dark output of the line CCD 74 is corrected by the image processing section at a subsequent stage. The dark output level can be obtained by closing the shutter by the microprocessor 100 when no film image is read.

An output terminal of the CDS 126 of each signal processing section provided in each of the three signal processing systems is connected to one of AF circuits 138R, 138G, 138B. The AF circuit 138G is constructed from a digital band-pass filter (BPF) 140, an absolute value arithmetic circuit (ABS) 142, an adding circuit (ADD) 146, and an I/F circuit 148. The BPF 140 extracts only a relatively high frequency component corresponding to an edge of an image as edge data from green image data outputted from the CDS 126. The ABS 142 converts the inputted edge data to an absolute value and outputs this absolute value. The ADD 146 accumulatively calculates data showing the absolute value of the edge data outputted from the ABS 142. The I/F circuit 148 is connected to the microprocessor 46 through the bus 102 and outputs data (green AF data) showing the accumulated value of the absolute value of the edge data outputted from the ADD 146 to the microprocessor 100.

Since the AF circuits 138R and 138B have the same construction as the AF circuit 138G, their explanations are omitted here. However, similar to the above case, red and blue AF data are outputted to the microprocessor 46.

The AF circuit 138G constitutes a focusing means with respect to the focusing chart 58 and a focusing means with respect to an image in the present invention. The AF circuits 138R and 138B constitute the focusing means with respect to the image in the present invention.

A lens drive motor 119 and a lens position sensor 150 are connected to the motor driver 108. The lens drive motor 119 moves the forming position of an image formed by the lens unit 72 along an optical axis L by entirely moving the lens unit 72. The lens position sensor 150 detects the position of the lens unit 72. The microprocessor 100 adjusts the forming position of the film image formed by the lens unit 72 in predetermined timing on the basis of the AF data inputted from the AF circuit 138.

Figure 12:
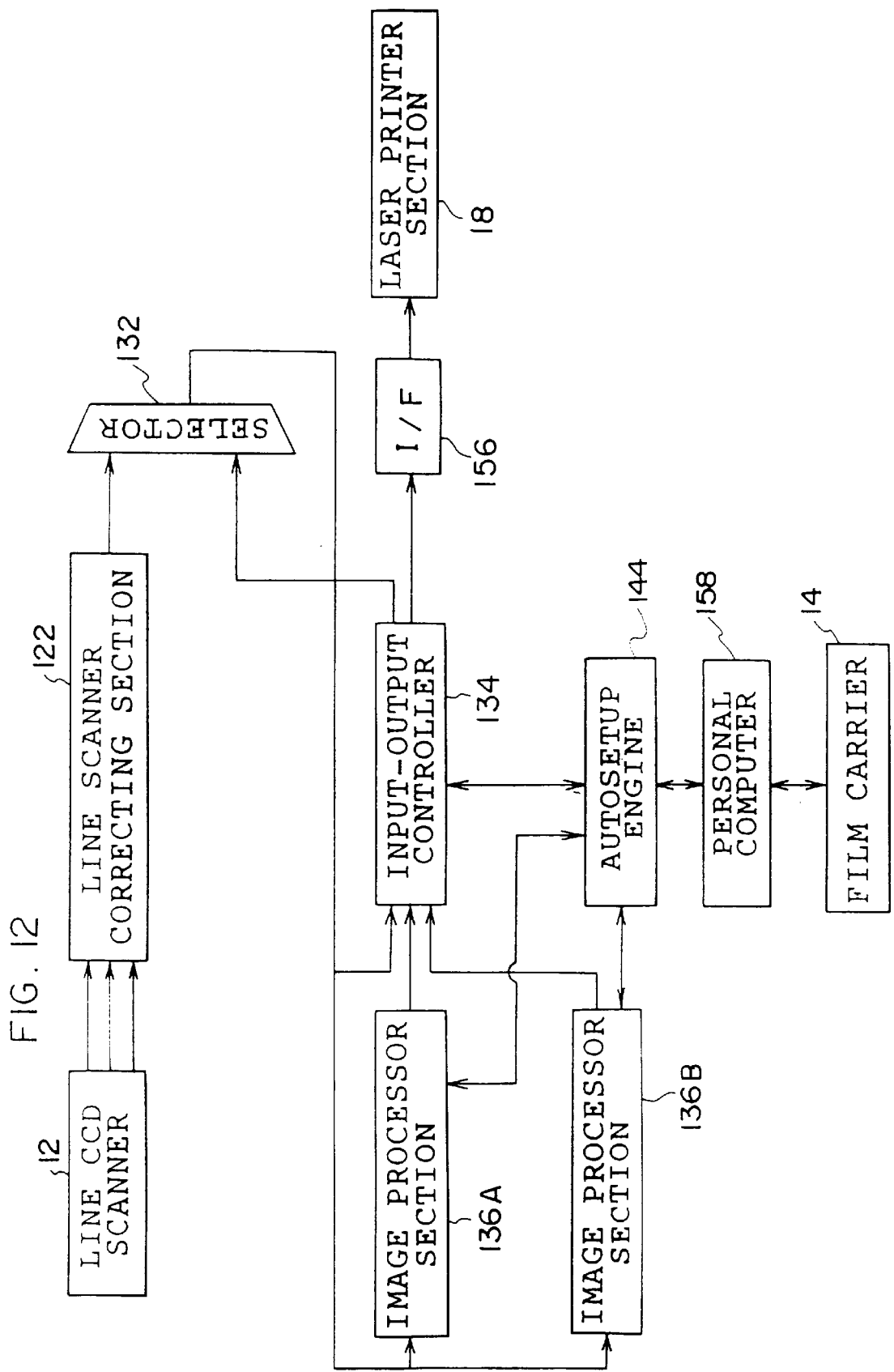
FIG. 12 is a block diagram showing the schematic construction of an image processing section in accordance with one embodiment of the present invention.

The construction of the image processing section 16 will next be explained with reference to FIG. 12. In the image processing section 16, a line scanner correcting section 122 is arranged in accordance with the line CCD scanner 12. In the line scanner correcting section 122, three signal processing systems each constructed from a dark correcting circuit, a defective pixel correcting section, and a brightness correcting circuit (these correcting circuits and this correcting section are not illustrated in the drawings) are provided in accordance with red, green and blue image data outputted from the line CCD scanner 12 in parallel with each other. These correcting circuits and this correcting section correct data of the film image as a reading object inputted from the line CCD scanner 12 and make new data by supplementing the data of a defective pixel.

In the line CCD 74, three lines (CCD cell columns) are sequentially disposed and are spaced at predetermined interval from each other along the conveying direction of the photographic film 22. Accordingly, there are time differences in the timing for starting outputs of the image data of red, green and blue light color components from the line CCD scanner 12. The line scanner correcting section 122 delays output timing of the image data at different delay times for each light color component so as to simultaneously output the red, green, and blue image data of the same pixel on the film image.

An output terminal of the line scanner correcting section 122 is connected to an input terminal of a selector 132. The image data outputted from the line scanner correcting section 122 are inputted to the selector 132. The input terminal of the selector 132 is also connected to a data output terminal of an input-output controller 134. Exdata are inputted file image data are inputted from the input-output controller 134 to the selector 132. An output terminal of the selector 132 is connected to the data input terminals of the input-output controller 134 and the image processor sections 136A and 136B. The selector 132 can selectively output the inputted image data to the input-output controller 134 and the image processor sections 136A and 136B.

The image processor section 136A has frame memory and an image processor (the memory and the processor are not illustrated in the drawings), and the image data inputted from the selector 132 are stored in one of three frame memories. The image processor inputs the image data stored in the frame memory and performs various kinds of image processings such as gradation conversion, color conversion, hyper-tone processing for compressing the gradation of an ultra-low frequency luminance component of an image, hyper-sharpness processing for strengthening sharpness while a granular shape is restrained, and the like.

The processing condition of the above image processings is automatically calculated by an autosetup engine 144 and the image processings are performed in accordance with the calculated processing condition.

The image processor constituting the image processor section 136A is connected to the input-output controller 134 and the processed image data are temporarily stored in the frame memory constituting the image processor section 136A. Thereafter, the image data are outputted to the input-output controller 134 in predetermined timing. The image processor section 136B has the same construction as the above image processor section 136A. Accordingly, an explanation of the image processor section 136B is omitted here.

The autosetup engine 144 has a CPU, RAM (e.g., DRAM), ROM (e.g., ROM capable of rewriting stored contents) and input-output ports and is constructed by connecting these members to each other through buses.

In this embodiment, the individual film image is first read (hereinafter, called a prescan) by the line CCD scanner 14 with relatively low resolution. Next, the film image is secondarily read (hereinafter, called a fine scan) with relatively high resolution. When the density of the film image is extremely low (e.g., a negative image of excessive exposure in a negative film), the film image is read in a reading condition (red, green, and blue light amounts of light irradiated onto the photographic film for each wavelength area, and an electric charge accumulating time of a CCD) determined such that no saturation of accumulated electric charges is caused in the line CCD 74. The image data (prescan image data) obtained by this prescan are inputted from the selector 132 to the input-output controller 134 and are further outputted to the autosetup engine 144 connected to the input-output controller 134.

The autosetup engine 144 calculates the image processing condition for the image data (fine scan image data) obtained by the fine scan using the line CCD scanner 12 on the basis of the prescan image data of the film image of the plurality of frames inputted from the input-output controller 134. The autosetup engine 144 then outputs the calculated processing conditions to the image processors of the image processor section 136. In the calculation of the image processing conditions, it is determined whether or not there are a plurality of film images obtained by taking a photograph of a similar scene from the exposure amount at the photographing time, the type of photographing light source, and other characteristic amounts. When there are a plurality of film images obtained by taking a photograph of a similar scene, image processing conditions for the fine scan image data of these film images are determined such that these image processing conditions are the same or similar to each other.

Optimum processing conditions for the image processing are changed in accordance with whether the processed image data are used to record an image on printing paper in the laser printer section 18, or are externally outputted, and the like. The two image processor sections 136A and 136B are arranged in the image processing section 16. Accordingly, for example, when the image data are used to record an image on the printing paper and are also externally outputted and the like, the autosetup engine 144 calculates the optimum processing conditions for each use and outputs each of the optimum processing conditions to the image processor sections 136A and 136B. Thus, in the image processor sections 136A and 136B, the image processing is performed for the same fine scan image data in processing conditions different from each other.

Further, the autosetup engine 144 calculates the image recording parameters for prescribing a gray balance and the like in the recording of the image on the printing paper by the laser printer section 18 on the basis of the prescan image data of the film image inputted from the input-output controller 134. The autosetup engine 144 outputs this parameter simultaneously when the image data for recording (described later) are outputted to the laser printer section 18.

Similar to the above case, the autosetup engine 144 also calculates the image processing conditions for the file image data inputted from its exterior.

The input-output controller 134 is connected to the laser printer section 18 through the I/F circuit 156. When the processed image data are used to record an image on the printing paper, the image data processed by the image processor section 136 are outputted as image data for recording from the input-output controller 134 to the laser printer section 18 through the I/F circuit 156. The autosetup engine 144 is also connected to the personal computer 158. When the processed image data are externally outputted as an image file, the image data processed by the image processor section 136 are outputted from the input-output controller 134 to the personal computer 158 through the autosetup engine 144.

An unillustrated conveying control section constituting the personal computer 158 is connected to the film carrier 14 and controls conveyance of the photographic film 22 by the film carrier 14. When an APS film is set by the film carrier 14, information (e.g., an image recording size and the like) read from a magnetic layer of the APS film by the film carrier 14 is inputted to the conveying control section.

An unillustrated driver for reading/writing data with respect to a memory medium such as a memory card, and a communication controller for communicating with another information processor are connected to the personal computer 158 through an unillustrated extension slot. When image data for external output are inputted from the input-output controller 134, these image data are outputted to the exterior (the above driver and the communication controller and the like) as an image file through this extension slot. When the file image data are inputted from the exterior through the extension slot, the inputted file image data are outputted to the input-output controller 134 through the autosetup engine 144. In this case, the input-output controller 134 outputs the inputted file image data to the selector 132.

The image processing section 16 outputs the prescan image data and the like to the personal computer 158 and displays a film image read by the line CCD scanner 12 on a display 164. The image processing section 16 displays the image which it estimates will be obtained when recording this film image on printing paper on the display 164. When a correction of the image and the like are commanded by an operator through a keyboard 166, this correction and the like can be also reflected in the image processing conditions.

Figure 5:
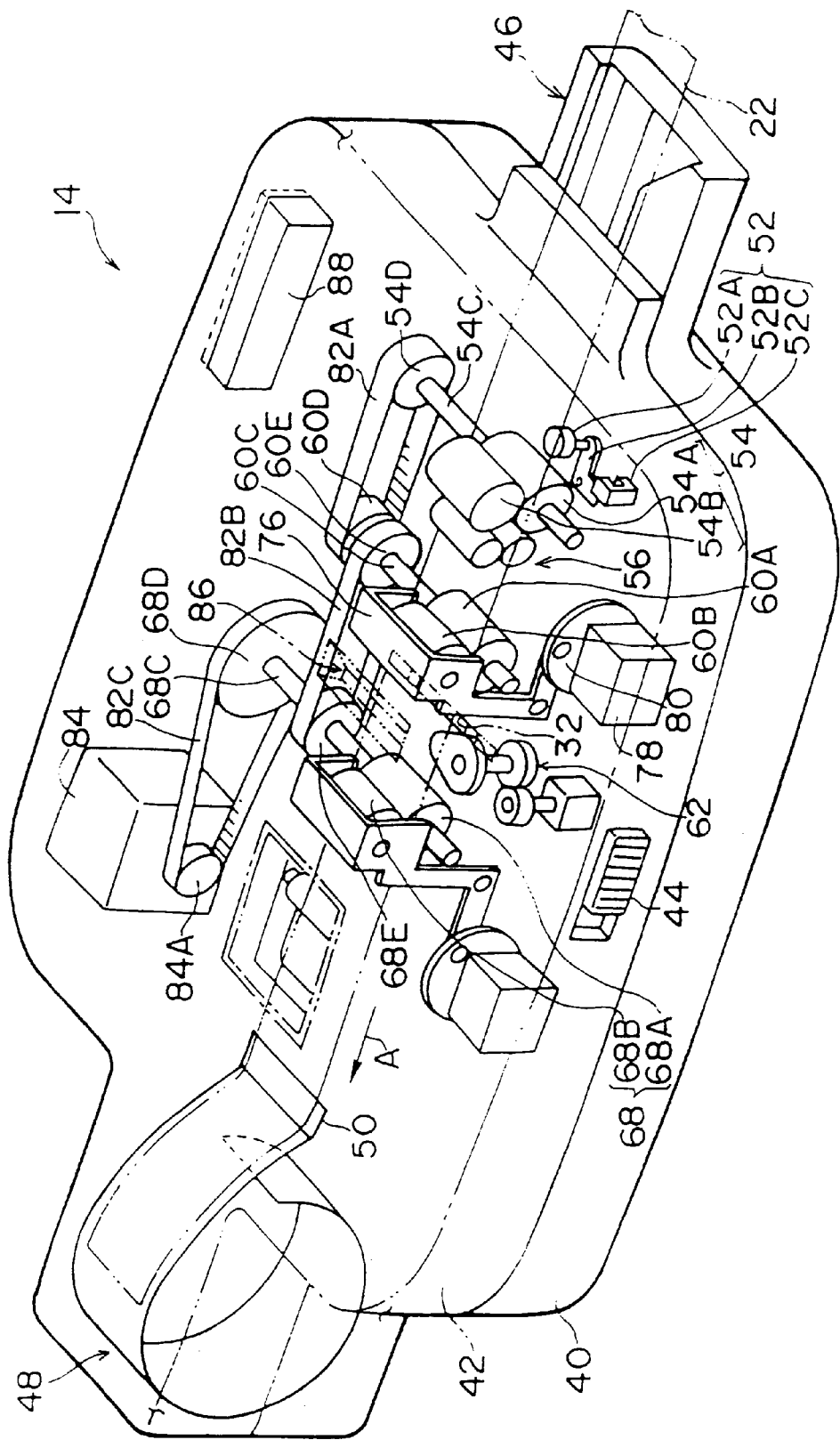
FIG. 5 is a perspective view schematically showing the internal structure of a film carrier in accordance with one embodiment of the present invention.

The film carrier 14 will next be explained in detail with reference to FIGS. 5 to 9. The film carrier 14 in this embodiment is shown in FIG. 5. This film carrier 14 can be applied to conveyance of the photographic film 22 of 135 size. A dedicated film carrier is prepared for each size of photographic film (e.g., a slide film (a reversal film), an APS film, a 120 film (brownie), and the like) except for the photographic film of 135 size.

As shown in FIG. 5, a cover 42 capable of being opened and closed with respect to a base 40 is attached to the base 40 in the film carrier 14 and has approximately the same shape as the base 40. A lever 44 for opening and closing the cover 42 is attached to one side face of the cover 42 along a conveying direction (the direction of an arrow A and its opposite direction) of the photographic film 22. An unillustrated engaging portion of this lever 44 is engaged with an unillustrated hole formed in the base 40 so that the cover 42 can be closed in a state in which this cover 42 comes into press contact with the base 40. The engaged state of the base 40 and the cover 42 provided by the lever 44 is released by operating the lever 44 by an operator so that the cover 42 can be opened.

Figure 6:
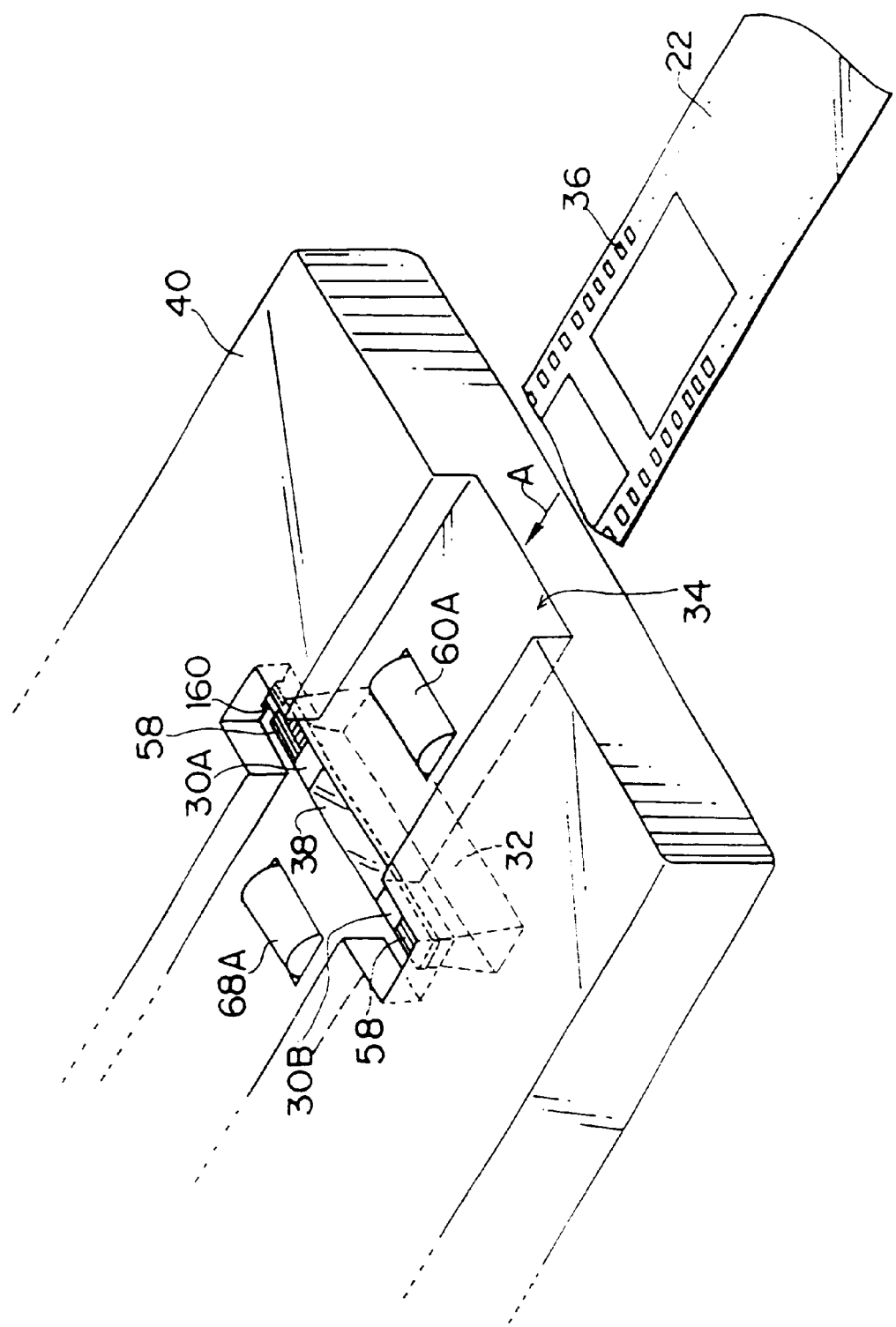
FIG. 6 is a perspective view schematically showing a portion near a slit hole formed in a film conveying path of the film carrier in accordance with one embodiment of the present invention.

A film insertion port 46 for inserting the photographic film 22 therein is formed on one side face of the base 40 perpendicular to the conveying direction (the direction of the arrow A and its opposite direction) of the photographic film 22. As shown in FIG. 6, a film conveying path 34 extending from the film insertion port 46 is formed in the base 40. The photographic film 22 inserted into the film insertion port 46 is conveyed along the film conveying path 34 while this photographic film 22 is held in this film conveying path 34.

Further, as shown in FIG. 5, a film winding portion 48 is formed in the base 40 and the cover 42 by expanding a portion of the side of the film carrier 14 opposite the side of the film insertion port 46. A guide plate 50 approximately curved into a circular-arc shape is disposed within this film winding portion 48 and guides the photographic film 22 along an inner circumferential face of the film winding portion 48. Accordingly, the photographic film 22 conveyed along the film conveying path 34 and having already been prescanned is guided by the guide plate 50 so that this photographic film is stored in a wound state within the film winding portion 48.

Further, a leading end detecting sensor 52, a conveying roller pair 54, a dust removing roller 56, a pair of conveying rollers 60, an LHP switching lever 62 having a light interrupting portion 62A, and a pair of conveying rollers 64 are sequentially arranged along the film conveying direction of the film conveying path 34 formed in the base 40.

The leading end detecting sensor 52 is constructed from a crank 52B rotated with a bent portion as a rotating shaft, and a photo-interrupter 52C. A contact wheel 52A coming in contact with the photographic film 22 is rotatably attached to one end of the crank 52B. The photo-interrupter 52C is constructed by combining a light emitting element and a light receiving element for detecting when the other end of the crank 52B has passed. The crank 52B is rotated when the photographic film 22 is conveyed along the film conveying path 34 and an edge of the photographic film 22 comes in contact with the contact wheel 52A of the leading end detecting sensor 52. Since the crank 52B is rotated, the other end of the crank 52B passes through the portion between the light emitting element and the light receiving element of the photo-interrupter 52C. Thus, it is possible to detect that the leading end of the photographic film 22 has passed through the film conveying path 34.

The conveying roller pair 54 comprises a drive roller 54A rotated by transmitting a driving force from a roller drive motor 84 disposed on the base 40, and a driven roller 54B rotated by the rotation of this drive roller 54A. The photographic film 22 is supported between the drive roller 54A and the driven roller 54B and is conveyed by these rollers. Further, as shown in FIG. 11, the roller drive motor 84 is connected to the motor driver 108.

The axial lengths of the drive roller 54A and the driven roller 54B of the conveying roller pair 54 are set such that these rollers do not come in contact with perforations 36 formed in the photographic film 22. Namely, these axial lengths are set such that these rollers come in contact with only a film image (an image recording range) recorded on the photographic film 22. These axial lengths are set in consideration of the following. Namely, when the photographic film 22 is conveyed in a state in which at least one of the drive roller 54A and the driven roller 54B comes in contact with the perforations 36 formed in the photographic film 22, there are cases when the photographic film 22 cannot be stably conveyed due to irregularities caused by forming the perforations 36.

The driven roller 54B coming in contact with an emulsion face (a recording face of the film image) side of the photographic film 22 is formed from a soft material such that no film image recorded on the photographic film 22 is damaged. The dust removing roller 56 is arranged to remove dust and the like attached to a surface of the photographic film 22 therefrom.

Similar to the above-mentioned conveying roller pair 54, the conveying roller pair 60 comprises a drive roller 60A rotated by transmitting the driving force from the roller drive motor 84, and a driven roller 60B rotated by the rotation of this drive roller 60A. The conveying roller pair 60 supports the photographic film 22 between these rollers and conveys the photographic film 22 by these rollers. Similar to the drive roller 54A and the driven roller 54B mentioned above, the lengths of the drive roller 60A and the driven roller 60B are set such that the drive roller 60A and the driven roller 60B do not come in contact with the perforations 36 formed in the photographic film 22. Similar to the above driven roller 54B, the driven roller 60B is also formed from a soft material. Both ends of the rotating shaft of the driven roller 60B are supported by a supporting plate 76 approximately formed in a U-shape so as not to prevent the rotation of the driven roller 60B. A connecting portion approximately formed in an L-shape is integrally formed at one end of this supporting plate 76 and the other end of this connecting portion is connected to an eccentric cam 80 connected to the drive shaft of a motor 78. Accordingly, when the motor 78 is driven and the eccentric cam 80 is rotated, the driven roller 60B supported by the supporting plate 76 is moved in a direction approaching the drive roller 60A. The driven roller 60B is normally located in a position separated by a predetermined distance from the drive roller 60A. However, when the conveyance of the photographic film 22 is started and the motor 78 is driven, the driven roller 60B is moved in a direction in which the driven roller 60B comes in contact with the drive roller 60A, and the photographic film 22 is supported and conveyed by these rollers.

Figure 10:
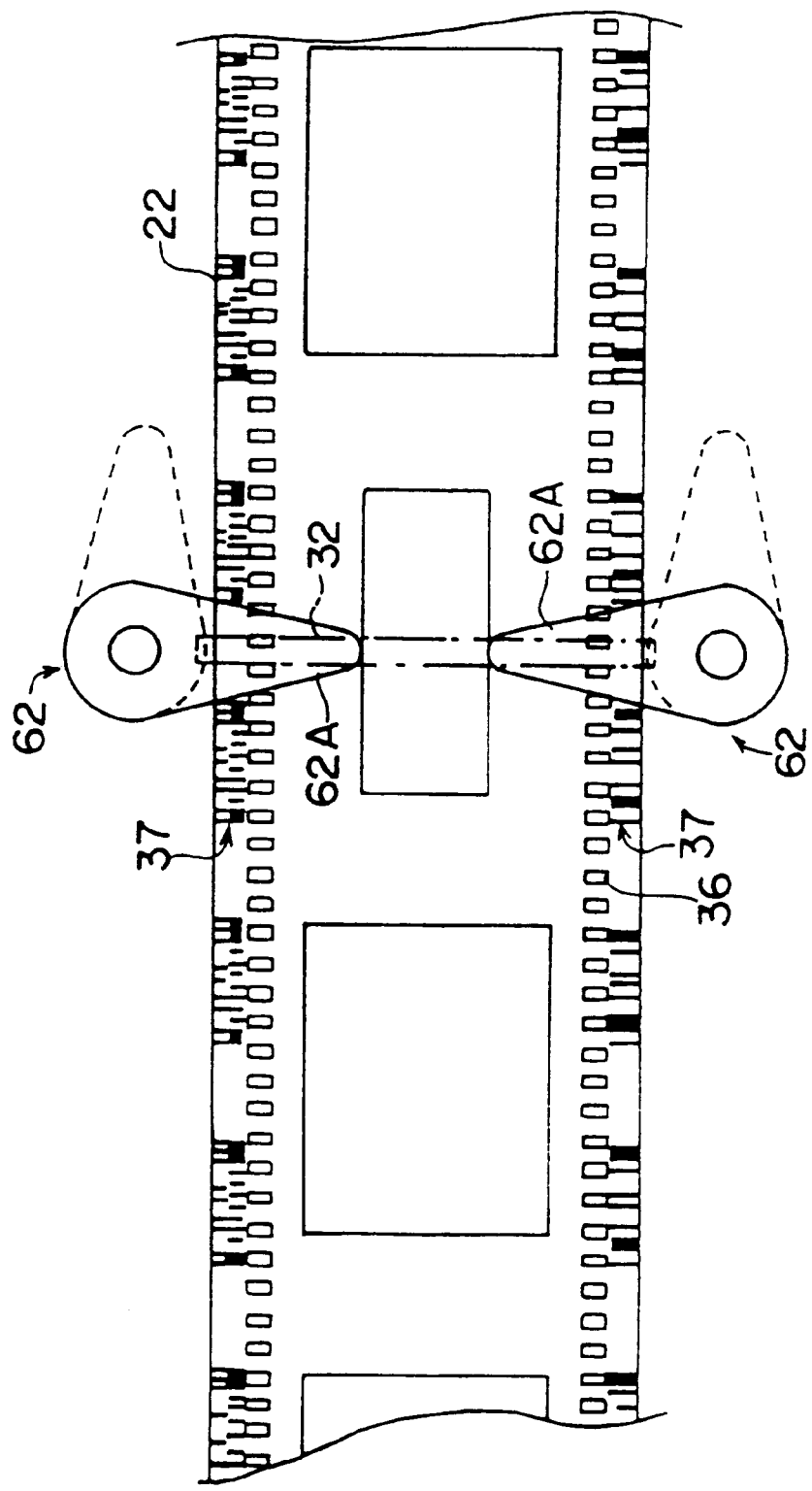
FIG. 10 is a view explaining an operating state of an LHP lever of the film carrier in accordance with one embodiment of the present invention.

As shown in FIG. 10, when the film image recorded in the photographic film 22 is a panoramic image, the light interrupting portion 62A of the LHP switching lever 62 interrupts light transmitted through an unrecording portion of the image of the photographic film 22. An unillustrated sensor detects whether the film image recorded on the photographic film 22 is a panoramic image or not. As shown in FIG. 10, the LHP switching lever 62 is disposed on each side of the photographic film 22 in its transverse direction (only one of the LHP switching levers 62 is shown in FIG. 5).

The conveying roller pair 68 disposed on the downstream side of the LHP switching lever 62 in the film conveying direction have approximately the same construction as the above conveying roller pair 60. Therefore, an explanation of the conveying roller pair 68 is omitted here.

A pulley 54D is attached to one end of a rotating shaft 54C of the drive roller 54A. Two pulleys 60D and 60E are attached to one end of a rotating shaft 60C of the drive roller 60A and are separated from each other by a predetermined interval. The pulley 60D attached to the rotating shaft 60C of the drive roller 60A is attached in a position parallel to the pulley 54D attached to the rotating shaft 54C of the drive roller 54A. A timing belt 82A is entrained around these pulleys 54D and 60D.

Two pulleys 68D and 68E are also attached to one end of a rotating shaft 68C of the drive roller 68A. The pulley 68E attached to this rotating shaft 68C is attached in a position parallel to the pulley 60E which is attached to the rotating shaft 60C of the drive roller 60A. A timing belt 82B is entrained around these pulleys 60E and 68E.

Further, a roller drive motor 84 is attached to the base 40 of the film carrier 14. A pulley 84A is attached to the leading end portion of an unillustrated drive shaft of the roller drive motor 84. A timing belt 82C is entrained around this pulley 84A and the pulley 68D attached to the rotating shaft 68C of the drive roller 68A of the conveying roller pair 68.

Accordingly, a driving force provided by driving the roller drive motor 84 is transmitted to the drive rollers 68A, 60A, and 54A through the timing belts 82C, 82B, and 82A. Therefore, the drive rollers 68A, 60A, and 54A are simultaneously rotated in the same direction.

The side wall constituting the film conveying path 34 are cut out in the transverse direction of the film conveying path 34 between the conveying roller pairs 60 and 68 disposed along the film conveying path 34, i.e., in the vicinity of a central portion of the film conveying path 34 so that the film conveying path 34 is substantially enlarged in width. A slit hole 32 extending in a direction perpendicular to the film conveying direction is formed in this enlarged width portion 34A. This slit hole 32 is formed such that the length of this slit hole 32 is longer than the width of the photographic film 22 in its transverse direction of the film image recorded on the photographic film 22 as mentioned above.

Figure 7:
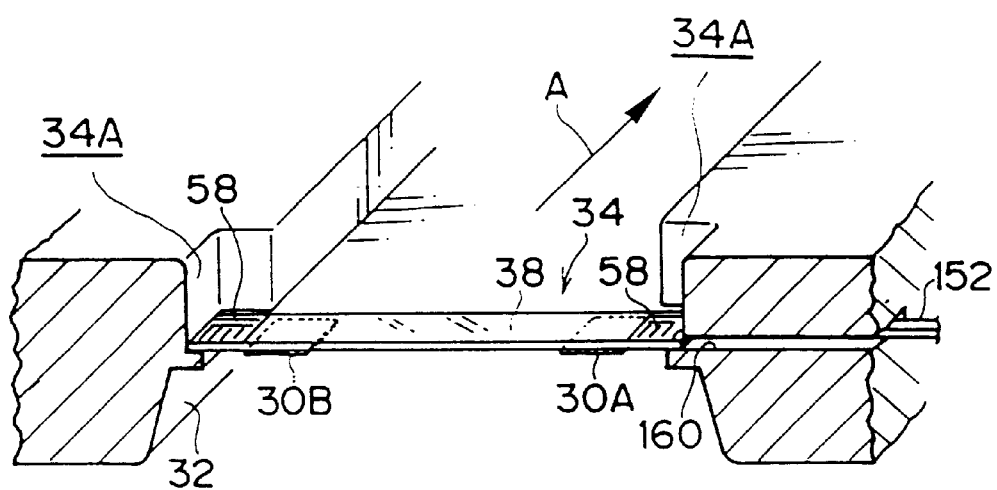
FIG. 7 is a partially broken enlarged perspective view showing a portion near the slit aperture formed in the film conveying path of the film carrier in accordance with one embodiment of the present invention.

As shown in FIGS. 6 and 7, a glass plate 38 is fitted into the slit hole 32. Focusing charts 58 are formed at both ends in the longitudinal direction of this glass plate 38 (in the vicinity of a holding position of the image film 22 in the film conveying path 34) on the face forming the film conveying path 34 (the upper face in FIG. 7).

The focusing chart 58 is constructed such that a plurality of line segments attached in parallel with each other at predetermined intervals in the transverse direction of the film conveying path 34 along the longitudinal direction of the film conveying path 34, and a plurality of line segments attached in parallel with each other at predetermined intervals in the longitudinal direction of the film conveying path 34 along the transverse direction of the film conveying path 34 are formed in predetermined areas of the glass plate 38. When one portion (a portion corresponding to the focusing chart 58) of light emitted from the light source 64 is transmitted through the glass plate 38, this light portion is incident to the line CCD 74 through a slit hole 86 formed in the cover 42. Then, focusing control is performed by the microprocessor 100 such that the contrast of an image of the focusing chart 58 formed by the light transmitted through the glass plate 38 is maximized.

Figure 8:
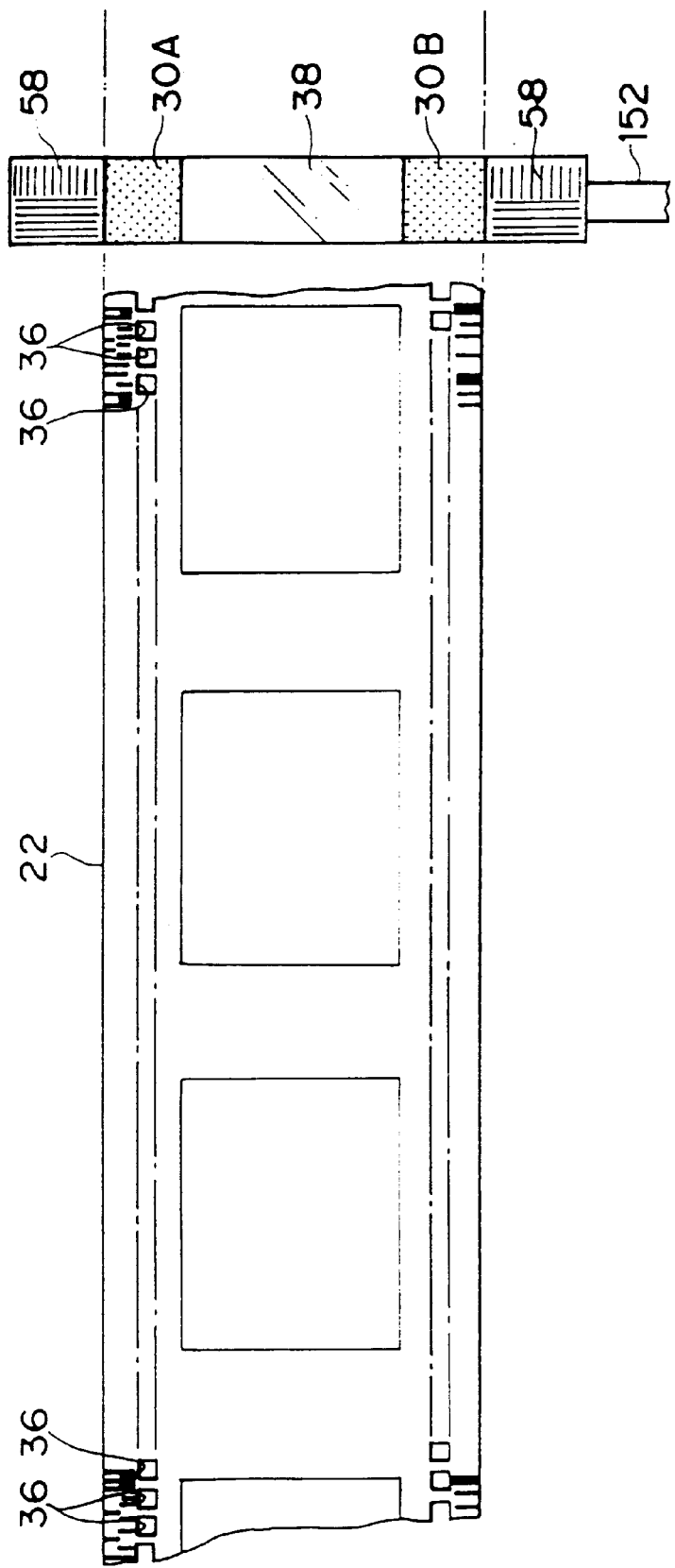
FIG. 8 is a view explaining the relation in position between a film and a glass plate of the film carrier in accordance with one embodiment of the present invention.
Figure 9:
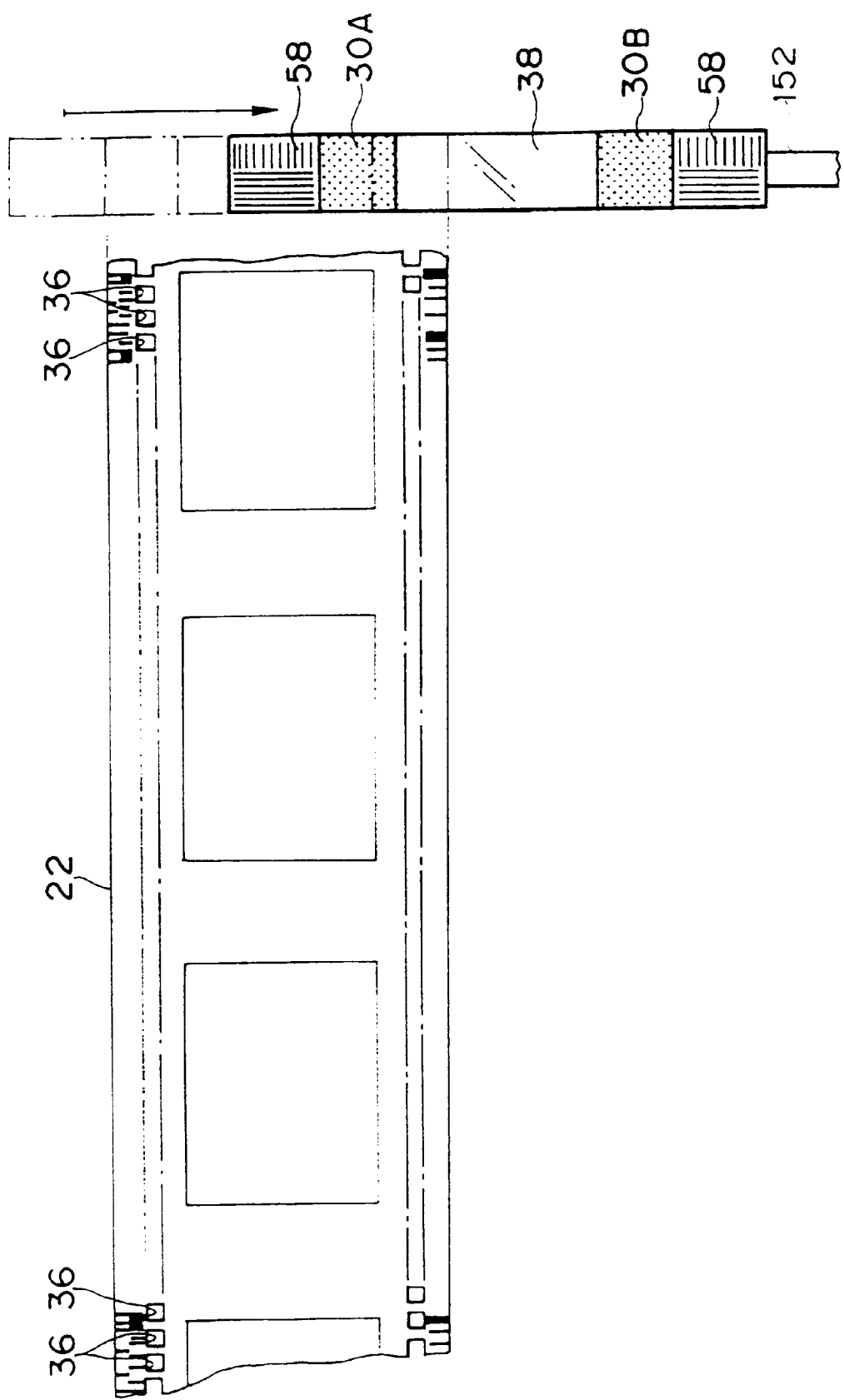
FIG. 9 is a view explaining the relation in position between the film and the glass plate of the film carrier in accordance with one embodiment of the present invention.

A storing recessed portion 160 is formed on one side face of the slit hole 32 in its longitudinal direction in accordance with a position of the glass plate 38. As shown in FIG. 11, the leading end detecting sensor 52 is connected to the motor driver 108. When the leading end detecting sensor 52 detects that the leading end of the photographic film 22 has passed through the film conveying path 34, the motor driver 108 rotates a glass plate drive motor 112 in predetermined timing in a normal or reverse direction. A crank 152 of the glass plate drive motor 112 (see FIG. 11) connected to the motor driver 108 is fixedly attached to one end of the glass plate 38. The glass plate 38 is stored from one end side into the storing recessed portion 160 by rotating the glass plate drive motor 112 in the normal direction. As shown in FIG. 9, when the glass plate 38 is stored in a predetermined position, the focusing chart 58 formed at the other end of the glass plate 38 is moved to approximately a central position of the film conveying path 34 in its transverse direction. When the glass plate drive motor 112 is rotated in the reverse direction, the focusing charts 58 at both ends of the glass plate 38 are moved back to positions on both sides of the film conveying path 34 in the transverse direction of the film conveying path 34 (see FIG. 8).

An evaporating film for reducing light is evaporated on the glass plate 38 in a position inside each focusing chart 58 in the longitudinal direction of the glass plate 38. An evaporating portion of the glass plate 38 as this evaporating film for reducing light constitutes ND filters 30A and 30B as light reducing filters. Namely, one portion (portions corresponding to the perforations 36 formed outside an image recording range of the photographic film 22 and a bar code 37 recording information with respect to the photographic film 22) of the light emitted from the light source 64 is reduced and this light is transmitted through the photographic film 22 and is then incident to the line CCD 74 as data for a focusing adjustment through the slit aperture 86 formed in the cover 42. Thus, a light transmitting portion for transmitting light without interrupting and reducing this light is constructed in an approximately central portion (a portion in which the focusing charts 58 and the ND filters 30A and 30B are not formed) of the glass plate 38.

This film carrier 14 is mounted to a mounting portion 154 (see FIG. 2) formed in a body of the digital laboratory system 10 and is connected to the body of the digital laboratory system 10 through a connector 88.

Operation of the image reader in this embodiment will next be explained.

When reading processing is performed in the line CCD scanner 12 of the digital laboratory system 10, an operator inserts the photographic film 22 into the film insertion port 46 formed in the film carrier 14. At this time, the photographic film 22 is inserted such that a film image recorded on the photographic film 22 is directed in a predetermined direction. In this embodiment, the film image recorded on the photographic film 22 is inserted facing the side of the drive rollers 54A, 60A, 68A. The following explanation relates to when the operator first sets focusing control using the microprocessor 100 to automatic control by the operation of an unillustrated switch or a key operation of the personal computer 158.

When the photographic film 22 is inserted and the leading end of the photographic film 22 is detected by the leading end detecting sensor 52, the motor driver 108 rotates the glass plate drive motor 112 in the normal direction. Thus, as shown in FIG. 9, the focusing chart 58 at the other end of the glass plate 38 is moved to approximately the center of the film conveying path 34 in its transverse direction.

At this time, when light from the light source 64 is transmitted through the focusing chart 58 of the glass plate 38 and is incident to the line CCD 74, the focusing control at a first stage is performed by the microprocessor 100 so as to maximize the contrast of an image of the focusing chart 58. Thereafter, the motor driver 108 rotates the glass plate drive motor 112 in the reverse direction. As shown in FIG. 8, the focusing charts 58 at both ends of the glass plate 38 are each moved back to the sides of the film conveying path 34 in its transverse direction.

When the leading end of the photographic film 22 is detected by the leading end detecting sensor 52, the roller drive motor 84 is driven. The drive rollers 54A, 60A, and 68A are simultaneously rotated in the same direction by driving the roller drive motor 84. The driven rollers 54B, 60B, and 68B are also rotated by the rotations of these drive rollers 54A, 60A, and 68A so that the photographic film 22 is supported and conveyed by these rollers in a predetermined direction (the direction of an arrow A shown in each of FIGS. 4 to 6). Dust and the like attached to the surface of the conveyed photographic film 22 are removed therefrom by the dust removing roller 56 and the like.

When the photographic film 22 passes through an upper portion of the slit aperture 32 formed in the film conveying path 34, the light emitted from the light source 64 and transmitted through the slit aperture 32 and the photographic film 22 is incident to the line CCD 74 through the lens unit 72. Therefore, the line CCD 74 simultaneously reads the film image recorded on the photographic film 22 and the bar code 37 recording information of the photographic film 22, and performs a prescan. At this time, the microprocessor 100 may also perform the second stage focusing control by moving an image forming point position of the lens unit 72 by a lens drive motor 119 on the basis of data of the film image read by the line CCD 74 so as to maximize the contrast of the film image.

In this case, the image forming point position of the lens unit 72 is already moved in advance by the first stage focusing control. Accordingly, a focusing operation can be performed with high accuracy by only slightly moving the lens unit 72 in the second stage focusing control. In particular, in the digital laboratory system 10 in this embodiment, in the case of photographic films other than the photographic film of size 135, a dedicated film carrier is prepared for each size of these photographic films. Therefore, when the types of film carriers are different from each other, the positions of the photographic films in the direction of an optical axis L are also different from each other. However, in this case, the first stage focusing control can be performed by the focusing charts 58 arranged in each of the film carriers. Thus, the focusing operation can be performed with high accuracy by only slightly moving the lens unit 72 for each image in the focusing control at the second stage.

When a plurality of film carriers of the same kind are exchanged and used, the focusing charts 58 are located in the same position for each film carrier. Accordingly, the first stage focusing control is performed for a second film carrier and subsequent film carriers without actually performing the first stage focusing control. In this case, when a shift in the position of the photographic film 22 is caused by a change in situation such as a change in temperature and the like, and the focal length of a lens (one or plural lenses constituting the lens unit 72) is changed in accordance with this change in temperature, the focusing operation can be performed by correcting this shift and this change in focal length in the first stage focusing control.

Further, the first stage focusing control is performed by sliding and moving the glass plate 38 and locating each focusing chart 58 in an approximately central position of the film conveying path 34 in its transverse direction, i.e., a position of the film image. Accordingly, for example, when the photographic film 22 is curved, the focusing operation can be also performed with high accuracy by reducing this curving influence. When the photographic film 22 is not curved and no high accuracy is required in the focusing operation, the first stage focusing control may be performed in a state in which the focusing charts 58 are maintained in positions on both sides of the photographic film 22 in the transverse direction of the photographic film 22 as shown in FIG. 8.

Further, when the required accuracy is satisfied and the focusing operation is performed in the first stage focusing control, no second stage focusing control is required so that the focusing operation is facilitated.

During prescan, the light emitted from the light source 64 is reduced by the ND filters 30A and 30B disposed in both end portions of the slit aperture 32 in its longitudinal direction. Therefore, light passing through the perforations 36 of the photographic film 22 is reduced.

Thus, the light reduced by the ND filters 30A and 30B is incident to the line CCD 74 and the amount of the light passing through the perforation 36 is not excessively large. Further, the amount of the light transmitted through the film image recorded on the photographic film 22 is not excessively small. Accordingly, it is possible to precisely and simultaneously read the film image recorded on the photographic film 22 and the bar code 37 recording information of the photographic film 22.

When winding of the photographic film 22 around the film winding portion 48 is terminated, the motor driver 108 rotates the roller drive motor 84 in the reverse direction. Thus, the photographic film 22 is unwound from the film winding portion 48 and the film image again passes through an upper portion of the slit aperture 32 and a fine scan is performed. At this time, since the focusing operation is already performed with respect to the focusing charts 58 by the first stage focusing control, the focusing operation can be easily performed with high accuracy on the basis of the data of the film image read by the line CCD 74 when the third stage focusing control is performed.

In particular, in the case of the fine scan, the conveying speed of the photographic film 22 is generally lower than that for the prescan so that the image reading density is increased. Accordingly, the focusing operation (focusing control) is performed with respect to the focusing charts during the prescan at which the image reading density is relatively low. The focusing operation (focusing control) with respect to the image is performed during the fine scan at which the image reading density is relatively high.

Further, the focusing operation with respect to the image is also performed with high accuracy during the fine scan even when the photographic film 22 is curled or a shift in the position of the film image in the direction of the optical axis L is caused. For example, when the first stage focusing control is performed in a state in which the focusing charts 58 are located on both sides of the photographic film 22 in its transverse direction (see FIG. 8), a position of the film image is separated by constant distances from the positions of the focusing charts 58. Accordingly, in consideration of this, the film image can be read with high accuracy if a position of the lens unit 72 during the fine scan is further set from an image forming point position for maximizing the contrast of an image of each of the focusing charts 58 to a position offset by a prescribed offset amount. As mentioned above, when the photographic film 22 is curled, the position of the lens unit 72 during the fine scan may be also set to a position offset by the prescribed offset amount in consideration of this curl. In particular, in the line sensor, when the film image is stopped and read during focusing control, there is a case in which image positions are different from each other when the film image is moved and read (by subscan) at the fine scan time. In this case, the position of the lens unit 72 at the image reading time (fine scan time) may be also set to the position offset by the prescribed offset amount.

The focusing operation with respect to the focusing charts may be also performed without discriminating the prescan and the fine scan from each other when no shift in the position of the film image in the direction of the optical axis L is caused. Further, when this shift is caused, the focusing operation with respect to the image may be also performed.

The focusing control will next be explained when this focusing control is manually performed.

In this case, an operator first sets the film carrier 14 to the mounting portion 154 of the digital laboratory system 10. In this set state, light from the light source 64 is transmitted through a focusing chart 58 of the glass plate 38 and is incident to the line CCD 74. The focusing control at the first stage is performed by the microprocessor 100 so as to maximize the contrast of an image of the focusing chart 58.

At this time, as shown in FIG. 9, the focusing chart 58 at the other end of the glass plate 38 may be approximately located at the center of the film conveying path 34 in its transverse direction. However, as shown in FIG. 8, the focusing charts 58 at both ends of the glass plate 38 may be located on both sides of the film conveying path 34 in its transverse direction. When the focusing chart 58 at the other end of the glass plate 38 is approximately located at the center of the film conveying path 34 in its transverse direction, similar to the case of automatic control, the first stage focusing control can be performed by reducing the influences of curves of the photographic film 22 and the like. Further, in this case, after the first stage focusing control, the motor driver 108 rotates the glass plate drive motor 112 in the reverse direction and the glass plate 38 is slid and moved such that the focusing charts 58 at both the ends of the glass plate 38 are located on both the sides of the film conveying path 34 in its transverse direction.

Thereafter, the operator inserts the photographic film 22 into the film insertion port 46 formed in the film carrier 14. When the leading end of the photographic film 22 is detected by the leading end detecting sensor 52, the roller drive motor 84 is driven and the photographic film 22 is conveyed in a predetermined direction (the direction of an arrow A shown in each of FIGS. 4 to 6) while the photographic film 22 is held.

When the photographic film 22 passes through an upper portion of the slit aperture 32, the prescan is performed. At this time, the second stage focusing control may be also performed such that the contrast of the film image is maximized.

The subsequent explanation is similar to that in the case of the automatic control and is therefore omitted here.

Figure 13:
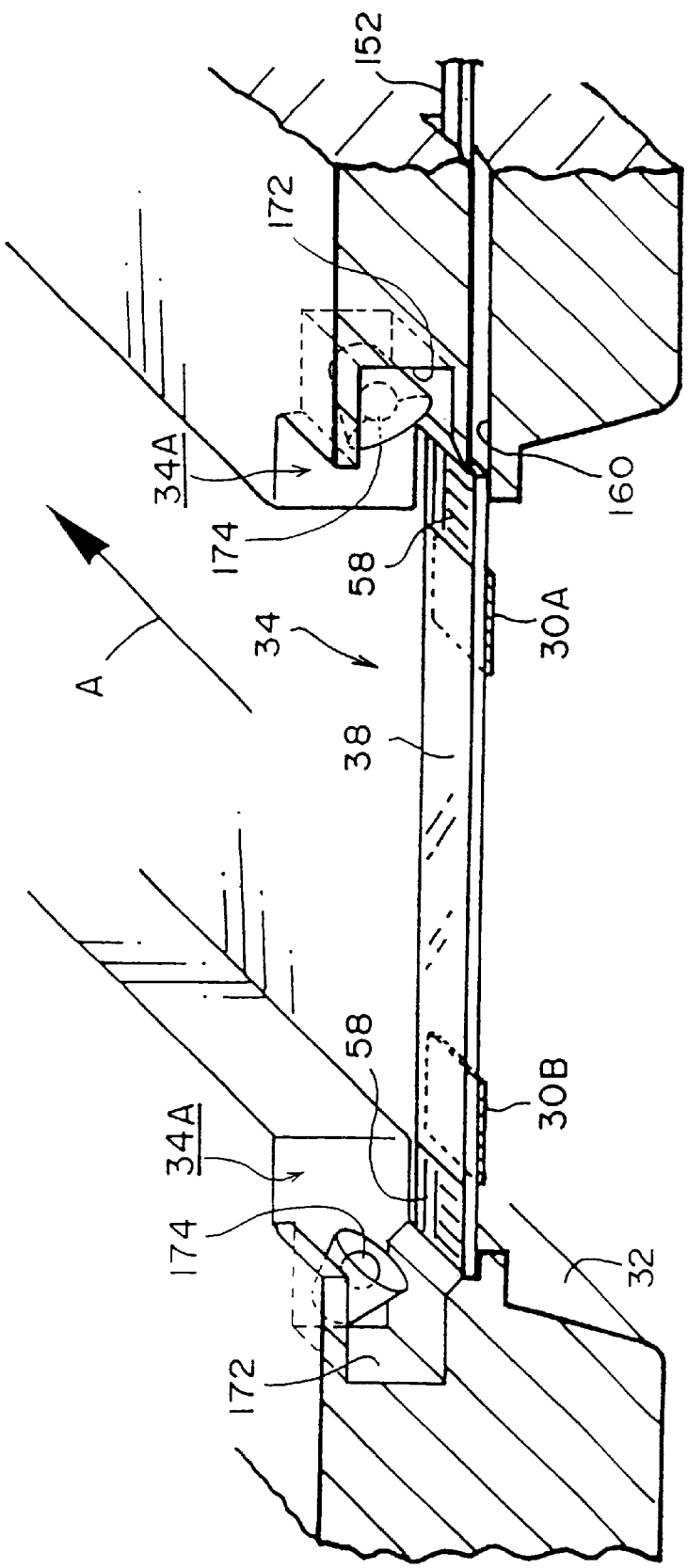
FIG. 13 is a partially broken enlarged perspective view showing a portion near the slit aperture formed in the film conveying path of the film carrier in accordance with another embodiment of the present invention.

FIG. 13 is a partially enlarged view showing a film carrier 170 in accordance with a second embodiment of the present invention. The second embodiment differs from the first embodiment in that the focusing control is performed by light reflected from light irradiated onto a focusing chart 58 from above when the focusing control is performed so as to maximize the contrast of an image of the focusing chart 58. In the following description, the same constructional elements, constructional members and the like as the film carrier 14 in the first embodiment are designated by the same reference numerals and an explanation thereof is omitted.

In the film carrier 170 in the second embodiment, a storing recessed portion 172 is formed by concavely forming both ends of an enlarged width portion 34A of the film carrier 14 in the first embodiment in its longitudinal direction (in transverse direction of the photographic film 22) and a portion of the enlarged width portion 34A on the side (an upper side in FIG. 13) of a line CCD 74 from the glass plate 38. A light source 174 for the focusing chart is attached to the storing recessed portion 172 to irradiate light onto the focusing chart 58 on the glass plate 38. The other constructions are set to the same construction as the film carrier 14 in the first embodiment.

Accordingly, when the film carrier 170 in the second embodiment is mounted to the digital laboratory system 10, the first stage focusing control can be performed by utilizing light reflected from light irradiated to the focusing chart 58 from the light source 174 for the focusing chart. In this case, similar to the case of the first embodiment, the focusing control at the first stage may be performed by the reflected light in a state (see FIG. 9) in which the glass plate 38 is slid and the focusing chart 58 at the other end of the glass plate 38 is approximately located at the center of the film conveying path 34 in its transverse direction. However, the first stage focusing control may also be performed while the focusing charts 58 are maintained in the positions located on both sides of the film conveying path 34 in its transverse direction.

Thus, completely similar to the first embodiment, a series of processings such as image reading is performed except that the focusing control is performed by utilizing the light reflected from the light irradiated onto the focusing chart 58. Further, even when the film carrier 170 in the second embodiment is used, the focusing control can be also performed by utilizing transmitted light from the light from the light source 64 irradiated to the focusing chart 58.

The type of light source 174 for the focusing chart is not particularly limited providing the required light for performing the focusing control by the reflected light from the focusing chart 58 can be irradiated onto the focusing chart 58. For example, an incandescent lamp can be used as the light source 174 for the focusing chart.

In the second embodiment, the light source for irradiating light to the focusing chart 58 is not limited to the above light source 174 for the focusing chart. For example, the light of the light source 64 (see FIGS. 3 and 4) of the digital laboratory system 10 may be guided to a portion above the focusing chart 58 by using a light transmitting means such as an optical fiber, and may be irradiated onto the focusing chart 58. Further, a light reflecting means such as a mirror may be arranged in at least one of the digital laboratory system 10 and the film carrier 170, and the light of the light source 64 may be reflected by this light reflecting means so that this light is irradiated to the focusing chart 58. When one portion of light (sunlight, light of an interior lamp and the like) within a room arranging the digital laboratory system 10 therein is irradiated to the focusing chart 58, this light may be utilized.

When the above light source 174 for the focusing chart, the light transmitting means and the light reflecting means are provided, it is preferable to dispose this light source and these means in positions dislocated from the course of transmitted light of the light irradiated from the light source 64 in consideration of a case in which an image is read by utilizing this transmitted light. Further, it is also preferable to dispose this light source and these means in positions dislocated from the course of the transmitted light of the light irradiated from the light source 64 to the focusing chart 58 when it is supposed that the focusing control is performed by using this transmitted light.

In this embodiment, the case when the film image recorded to the photographic film 22 is inserted onto sides of the drive rollers 54A, 60A, and 68A is explained. However, the film image may be also inserted on the side of the driven rollers 54B and 60B. In this case, a shift in position in the direction of the optical axis L between the film image and the focusing chart 58 is caused by the thickness of the photographic film 22. Accordingly, in consideration of this shift, a rotating amount of the lens drive motor 119 is corrected by the microprocessor 100 and the motor driver 108 so as to maximize the contrast of the film image and an image of the focusing chart 58 so that an image forming point position of the lens unit 72 is offset and corrected. Further, an offset amount of the image forming point position of the lens unit 72 can be also independently set in accordance with a case in which the focusing control (the focusing operation) is performed with respect to the focusing chart 58 or the film image. If the above offset amount of the image forming point position of the lens unit 72 is set to a preset value, an operation for setting or changing the offset amount is facilitated.

The original carrier (film carrier) in the present invention is not limited to the above film carriers 14 and 170. In short, it is sufficient to provide a focusing chart for performing the focusing operation in the vicinity of a holding position of the photographic film 22 in the film conveying path 34. In this case, the offset amount of the image forming point position of the lens unit 72 is set in accordance with the type of original carrier and a correction may be made such that the contrast of the film image and the image of the focusing chart 58 is maximized.

The focusing chart is not limited to the above focusing chart 58, but can be formed in various kinds of shapes and patterns. Further, the glass plate 38 is not necessarily set to be movable, but may be also fixedly arranged such that the focusing chart is located outside an effective range of the film image at any time. Namely, in this case, the focusing operation can be also performed so as to maximize the contrast of the image of the focusing chart, and the image of the focusing chart and the film image do not overlap each other. Moreover, no mechanism for moving the glass plate 38 is required so that structure is simplified.

Further, a light transmitting means is not necessarily disposed in an approximately central portion (a portion in which the focusing charts 58 and the ND filters 30A and 30B are not disposed) of the glass plate 38. In short, it is sufficient to transmit light from the light source 64 and irradiate this light onto an area including an image recording range of the photographic film 22 held in the film conveying path 34. Accordingly, for example, the light transmitting means may be also constructed from a light transmitting hole.

Further, the holding means for holding the photographic film 22 is not limited to the above film conveying path 34, but may be also constructed such that the photographic film 22 is substantially held by using e.g., a structure for simply disposing the photographic film 22 thereon.

The image film held by the film carrier is not limited to the above image film 22 (a color negative film of 135 size), but may also be, for example, a 240 film (a so-called APS film) or a color reversal film. The specific construction of the holding means is not particularly limited providing the holding means can hold the film in accordance with these film kinds.

In the case of the color reversal film, there is a case in which a slide mount is mounted for each image frame. In this case, a shift in the position of a film image in the direction of the optical axis L is caused by the thickness of the slide mount. Accordingly, it is sufficient to correct the image forming point position of the lens unit 72 in consideration of this shift. When the film thicknesses and curl amounts are different from each other in accordance with the film kinds, the image forming point position of the lens unit 72 is corrected (offset) in consideration of these differences.

In the case of a film carrier for various film sizes in which a mask having a predetermined shape is overlapped with the photographic film and an image of a desirable size is obtained by moving and exchanging this mask, the focusing chart may be also arranged in this film carrier or the mask.

Further, the present invention is not limited to the line sensor for reading an image by scanning light in a direction perpendicular to the conveying direction of the image film 22. A film carrier corresponding to a so-called area sensor for reading the image by irradiating light onto a predetermined area of the image film 22 at one time instead of the line sensor may be also used in the present invention. When the image is read by the area sensor, a focusing chart (e.g., a focusing chart in which line segments in a direction slantingly intersecting the conveying direction of the image film 22 are formed at a predetermined interval) having a shape different from that of the above focusing chart 58 may be also provided.

In a first aspect of the present invention, an original carrier comprises holding means capable of holding an original having an image recorded thereon; light transmitting means arranged in said holding means for transmitting light from a light source and irradiating the light onto an area including an image recording range of the original held by said holding means; and a focusing chart for performing a focusing operation disposed in the vicinity of an original holding position of said holding means. Accordingly, the focusing operation can be performed for each original carrier.

In a second aspect of the present invention, the focusing chart in the first aspect of the present invention is provided such that the focusing chart is located in a position outside the image recording range of the original of the light transmitting means. Accordingly, the original image and an image of the focusing chart do not overlap each other when the original image is read.

In a third aspect of the present invention, the focusing chart in the first aspect of the present invention is movably provided between a position outside the image recording range of the original and a position within the image recording range. Accordingly, the focusing operation can be performed with the focusing chart in the same position as the image by moving the focusing chart to a position within the image recording range.

In a fourth aspect of the present invention, an image reader comprises a plurality of types of original carriers each provided in any one of the first to third aspects and prepared in accordance with the type of original; a mounting portion capable of having one of the plurality of types of original carriers selectively mounted thereto; image reading means for reading the image of the original held by the holding means of the original carrier mounted to the mounting portion, and for reading the focusing chart provided in the original carrier; and focusing means for performing a focusing operation of the image reading means so as to maximize the contrast of an image of the focusing chart read by the image reading means. Accordingly, the focusing operation corresponding to each of the original carriers can be performed.

In a fifth aspect of the present invention, the focusing operation of the image reading means can be performed so as to maximize the contrast of the image read by the image reading means, and one of the focusing operation with respect to the focusing chart and the focusing operation with respect to the original can be selected in the fourth aspect of the present invention. Accordingly, it is possible to select one of the focusing operation with respect to the focusing chart and the focusing operation with respect to the original in accordance with the conditions.

In a sixth aspect of the present invention, one of the focusing operation with respect to the focusing chart and the focusing operation with respect to the original is selected in accordance with the state of the original in the fifth aspect of the present invention. Accordingly, when the positions are different for each image, the focusing operation with respect to the focusing chart is selected and the focusing operation with respect to the original is next selected so that the focusing operations can be performed with high accuracy.

In a seventh aspect of the present invention, one of the focusing operation with respect to the focusing chart and the focusing operation with respect to the original is selected in accordance with the reading density of the original in the fifth aspect of the present invention. Accordingly, the focusing operation can be performed by a suitable method in accordance with the reading density of the original.

In an eighth aspect of the present invention, the image reading means in one of the fourth to seventh aspects of the present invention reads the image in a position offset by a prescribed offset amount from a focusing position of the image reading means provided by the focusing means when the image of the original held by the holding means of the original carrier is read. Accordingly, the image can be read by correcting a shift in focusing even when the original is located in a position separated by a constant distance from the position of the focusing chart or the original is curled.

In a ninth aspect of the present invention, the offset amount in the eighth aspect of the present invention can be independently set in accordance with the type of the original carrier mounted to the mounting portion and in accordance with the focusing operation is performed with respect to said focusing chart or said original. Accordingly, the image can be read by setting the offset amount in accordance with a different original carrier. Further, the image can be read by setting the offset amount in accordance with a focusing object.

In a tenth aspect of the present invention, a present amount is first set as the reference and the offset amount may be changed or set by an operation from this present amount in the eighth or ninth aspect of the present invention. Accordingly, an operation for setting or changing the offset amount is facilitated. Further, when the film thicknesses and curl amounts are different from each other in accordance with the type of film, the focusing operation can be precisely performed with respect to the image by correspondingly changing the offset amount.

What is claimed is:

1. An image reader comprising:

a plurality of types of film carriers adapted for use with a corresponding variety of types of films;

each of the film carriers having:

holding means for holding a film having an image recorded thereon;

light transmitting means provided in said holding means for transmitting light from a light source and irradiating the light onto an area of the film having the recorded image when the film is held by said holding means;

a focusing chart for performing a focusing operation disposed in a vicinity of a film holding position of said holding means;

a mounting portion adapted for having said plurality of types of film carriers selectively mounted thereto;

image reading means for reading the image on the film held by the holding means of said film carrier mounted to said mounting portion, and for reading the focusing chart provided in said film carrier; and focusing means for performing the focusing operation of the image reading means so as to maximize a contrast of an image of the focusing chart read by said image reading means;

said focusing means adapted for performing the focusing operation of the image reading means so as to maximize the contrast of the image read by said image reading means; and one of the focusing operation with respect to said focusing chart and the focusing operation with respect to the film being able to be selected; and wherein said focusing chart is translatable between a position which is at once inside a range of said light transmitting means and outside an image recording range of the recorded film image, when the recorded film image is also inside the range of said light transmitting means, and a position inside the range of the recorded film image when the recorded film image is inside the range of said light transmitting means.

2. The image reader according to claim 1, wherein said focusing chart is read by transmitted light.

3. The image reader according to claim 1, wherein said focusing chart is read by reflected light.

4. The image reader according to claim 1, wherein one of the focusing operation with respect to said focusing chart and the focusing operation with respect to the film is selected in accordance with a position of the image recorded on the film in a direction of an optical axis of said light transmitting means.

5. The image reader according to claim 4, wherein said image reading means reads the image in a focusing position offset by a predetermined offset amount from an initial focusing position of said image reading means provided by said focusing means when the image of the film held by said holding means of said film carrier is read.

6. The image reader according to claim 5, wherein said offset amount can be independently set in accordance with the type of said film carrier mounted to said mounting portion and in accordance with whether said focusing operation is performed with respect to said focusing chart or the film.

7. The image reader according to claim 6, wherein a present value of said offset amount is first set as a reference and the offset amount may be changed or set by an operation from this reference.

8. The image reader according to claim 5, wherein a present value of said offset amount is first set as a reference and the offset amount may be changed or set by an operation from this reference.

9. The image reader according to claim 1, wherein one of the focusing operation with respect to said focusing chart and the focusing operation with respect to the film is selected in accordance with a reading density of said original.

10. The image reader according to claim 9, wherein said image reading means reads the image in a focusing position offset by a predetermined offset amount from an initial focusing position of said image reading means provided by said focusing means when the image of the film held by said holding means of said film carrier is read.

11. The image reader according to claim 10, wherein said offset amount can be independently set in accordance with the type of said film carrier mounted to said mounting portion and in accordance with whether said focusing operation is performed with respect to said focusing chart or the film.

12. The image reader according to claim 11, wherein the present value of said offset amount is first set as a reference and the offset amount may be changed or set by an operation from this reference.

13. The image reader according to claim 10, wherein the present value of said offset amount is first set as a reference and the offset amount may be changed or set by an operation from this reference.

14. The image reader according to claim 1, wherein said image reading means reads the image in a focusing position offset by a predetermined offset amount from an initial focusing position of said image reading means provided by said focusing means when the image of the film held by said holding means of said film carrier is read.

15. The image reader according to claim 14, wherein said offset amount can be independently set in accordance with the type of said film carrier mounted to said mounting portion and in accordance with whether said focusing operation is performed with respect to said focusing chart or the film.

16. The image reader according to claim 15, wherein the present value of said offset amount is first set as a reference and the offset amount may be changed or set by an operation from this reference.

17. The image reader according to claim 1, wherein each film carrier further comprises a film conveying path, and wherein said focusing chart is formed on a plate which is translatable across said film conveying path.

18. The image reader according to claim 17, wherein each of said film carriers is adapted to carry a film having perforations formed near an edge of the film, and wherein each of said film carriers further comprises a filter portion formed on said plate at a position corresponding to said perforations.

19. The image reader according claim 17, further comprising a second focusing chart formed on said plate and space apart from said other focusing chart by at least a width of the image recording range of the film.

20. The image reader according claim 19, wherein each of said film carriers is adapted to carry a film having perforations formed near both edges of the film along a transporting direction of the film within the film carrier, and wherein said filter portion corresponds to perforations formed on one of the edges of the film, and wherein said film carrier further comprises a second filter portion formed on said plate at a position corresponding to perforations formed on the other edge of the film.

21. A film carrier comprising:

holding means for holding a film having an image recorded thereon;

light transmitting means provided in said holding means for transmitting light from a light source and irradiating the light onto an area of the film having the recorded image when the film is held by said holding means; and a focusing chart for performing a focusing operation disposed in a vicinity of a film holding position of said holding means; and wherein said focusing chart is translatable between a position which is at once inside a range of said light transmitting means and outside an image recording range of the recorded film image, when the recorded film image is also inside the range of said light transmitting means, and a position inside the range of the recorded film image when the recorded film image is inside the range of said light transmitting means.

22. The film carrier according to claim 21, further comprising a film conveying path, and wherein said focusing chart is formed on a plate which is translatable across said film conveying path.

23. The film carrier according to claim 22, wherein said film carrier is adapted to carry a film having perforations formed near an edge of the film, and wherein said film carrier further comprises a filter portion formed on said plate at a position corresponding to said perforations.

24. The film carrier according to claim 22, further comprising a second focusing chart formed on said plate and space apart from said other focusing chart by at least a width of the image recording range of the film.

25. The film carrier according to claim 24, wherein said film carrier is adapted to carry a film having perforations formed near both edges of the film along a transporting direction of the film within the film carrier, and wherein said filter portion corresponds to perforations formed on one of the edges of the film, and wherein said film carrier further comprises a second filter portion formed on said plate at a position corresponding to perforations formed on the other edge of the film.

* * * * *